US012594945B2

(12) United States Patent     (10) Patent No.:   US 12,594,945 B2

Smalley et al.     (45) Date of Patent:     Apr. 7, 2026

(54) DETECTION AND REMEDIATION OF AN INSTABILITY CONDITION IN A VEHICLE-TRAILER SYSTEM

(71) Applicant: Toyota Motor Engineering & Manufacturing North America, Inc., Plano, TX (US)

(72) Inventors: Christopher James Smalley, Canton, MI (US); Patrick David Jordan, Austin, TX (US); Nicholas Earl Merkel, Canton, MI (US); Brian James Haugen, Plano, TX (US); Steven William Marion, Canton, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 284 days.

(21) Appl. No.: 18/456,811

(22) Filed: Aug. 28, 2023

(65) Prior Publication Data

US 2025/0074440 A1     Mar. 6, 2025

(51) Int. Cl.
| | |
|---|---|
| *B60W 50/08* | (2020.01) |
| *B60W 30/12* | (2020.01) |
| *B60W 50/14* | (2020.01) |

(52) U.S. Cl.
CPC .......... *B60W 50/082* (2013.01); *B60W 30/12* (2013.01); *B60W 50/14* (2013.01);
(Continued)

(58) Field of Classification Search
CPC .... B60W 50/082; B60W 30/12; B60W 50/14; B60W 2300/14; B60W 2520/125;
(Continued)

(56) References Cited

U.S. PATENT DOCUMENTS

| | | | |
|---|---|---|---|
| 6,466,863 | B2 | 10/2002 | Shirai et al. |
| 7,447,577 | B2 | 11/2008 | Hattori et al. |

(Continued)

*Primary Examiner* — Jason Holloway
*Assistant Examiner* — Madison B Emmett
(74) *Attorney, Agent, or Firm* — Christopher G. Darrow; Darrow Mustafa PC

(57) ABSTRACT

A stability monitoring system for detecting an instability condition in a moving vehicle-trailer system includes a processor and a memory communicably coupled to the processor. The memory may store a stability evaluation module configured to determine if a measured value of at least one stability evaluation parameter satisfies an associated predetermined condition. The stability evaluation module may be configured to, if the measured value of the stability evaluation parameter satisfies the associated predetermined condition, determine a total amount of time within a predetermined time period that the measured value of the stability evaluation parameter satisfied the associated predetermined condition. The stability evaluation module may be configured to, if the total amount of time that the measured value of the stability evaluation parameter satisfied the associated predetermined condition exceeds a significant proportion of the predetermined time period, control operation of the vehicle to generate a stability alert.

19 Claims, 10 Drawing Sheets

(52) U.S. Cl.
     CPC ... *B60W 2300/14* (2013.01); *B60W 2520/125*
                      (2013.01); *B60W 2520/14* (2013.01)

(58) Field of Classification Search
     CPC ..... B60W 2520/14; B60W 2040/1307; B60W
                  2040/1315; B60W 30/02; B60W 2552/30
     See application file for complete search history.

(56)                    References Cited

U.S. PATENT DOCUMENTS

| | | | |
|---|---|---|---|
| 9,527,528 B1 | 12/2016 | Harrison | |
| 9,849,911 B2 | 12/2017 | Lee et al. | |
| 11,634,128 B2 * | 4/2023 | Zarringhalam | B60W 30/12 |
| | | | 701/41 |
| 12,269,498 B1 * | 4/2025 | Rommel | B60W 40/02 |
| 2015/0246654 A1 * | 9/2015 | Tadic | G01P 15/02 |
| | | | 340/436 |
| 2015/0291155 A1 * | 10/2015 | Jonsson | B60W 30/02 |
| | | | 701/70 |
| 2015/0353096 A1 * | 12/2015 | Baust | B62D 13/005 |
| | | | 73/514.01 |
| 2020/0156606 A1 * | 5/2020 | Switkes | G08G 1/22 |
| 2021/0094577 A1 * | 4/2021 | Shalev-Shwartz | |
| | | | B60W 60/001 |
| 2021/0291818 A1 * | 9/2021 | Barth | B60W 30/0956 |
| 2021/0387630 A1 * | 12/2021 | Sung | B62D 47/025 |
| 2022/0136823 A1 * | 5/2022 | Joshi | G01S 17/08 |
| | | | 701/300 |
| 2022/0281448 A1 * | 9/2022 | Zarringhalam | B60W 10/18 |
| 2024/0167841 A1 * | 5/2024 | Brun | B60K 35/285 |
| 2024/0278785 A1 * | 8/2024 | Choi | B60W 30/188 |

* cited by examiner

DETECTION AND REMEDIATION OF AN INSTABILITY CONDITION IN A VEHICLE-TRAILER SYSTEM

TECHNICAL FIELD

The subject matter described herein relates to the dynamic stability of a vehicle moving along a road surface and, more particularly, to a system configured for detecting an insta-bility condition in a vehicle-trailer system in which the vehicle is towing a trailer along a road surface.

BACKGROUND

When a vehicle is towing a trailer, it is possible for the overall vehicle-trailer system to become unstable at certain speeds or in certain conditions, such as in high cross-winds or during lane changes. Factors that can contribute to system instability include improper balance of weight in the trailer, low trailer tire pressure, etc. Dynamic instability may inter-fere with operation of a vehicle lane tracing assist (LTA) system when the vehicle is in an autonomous or semi-autonomous mode. In some cases, it may be necessary for a human driver to assume full control of the vehicle to alleviate the instability condition as soon as possible. To facilitate rapid transfer of vehicle control from one or more autonomous systems to a user when an instability condition occurs, it would be beneficial to have a vehicle control system configured to warn the user that an instability con-dition exists in the vehicle-trailer system, and to automati-cally deactivate autonomous or semi-autonomous driver assist systems that may interfere with user control.

SUMMARY

In one aspect of the embodiments described herein, a stability monitoring system for detecting an instability con-dition in a moving vehicle-trailer system is provided. The system may include a processor and a memory communi-cably coupled to the processor. The memory may store a stability evaluation module including computer-readable instructions that when executed by the processor cause the processor to determine if a measured value of at least one stability evaluation parameter satisfies an associated prede-termined condition. The stability evaluation module may be configured to, if the measured value of the stability evalu-ation parameter satisfies the associated predetermined con-dition, determine a total amount of time within a predeter-mined time period that the measured value of the stability evaluation parameter satisfied the associated predetermined condition. The stability evaluation module may be config-ured to, if the total amount of time that the measured value of the stability evaluation parameter satisfied the associated predetermined condition exceeds a significant proportion of the predetermined time period, control operation of the vehicle to generate a stability alert.

In another aspect of the embodiments described herein, a computer-implemented method for detecting an instability condition in a moving vehicle-trailer system is provided. The method includes steps of computing a perceived curve radius of the vehicle, computing an expected value of at least one stability evaluation parameter using the perceived curve radius, determining that a measured value of the at least one stability evaluation parameter satisfies an associated prede-termined condition, determining a total amount of time within a predetermined time period that the measured value of the stability evaluation parameter satisfied the associated predetermined condition, determining that the total amount of time that the measured value of the stability evaluation parameter satisfied the associated predetermined condition exceeds a significant proportion of the predetermined time period, and controlling operation of the vehicle to generate a stability alert.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Embodiments described herein relate to a system for detecting an instability condition in a moving vehicle-trailer system. The stability monitoring-system includes a processor and a memory communicably coupled to the processor and storing a stability evaluation module including computer-readable instructions that when executed by the processor cause the processor to determine if a measured lateral acceleration of the vehicle satisfies a predetermined lateral acceleration condition and/or a measured yaw rate of the vehicle satisfies a predetermined yaw rate condition. The presence of either (or both of) a predetermined lateral acceleration condition and/or a predetermined yaw rate condition may indicate an instability condition in the vehicle-trailer system. If the measured lateral acceleration satisfies a predetermined lateral acceleration condition, the stability evaluation module may determine a total amount of time within a predetermined time period that the measured lateral acceleration satisfies the predetermined lateral acceleration condition. If the measured yaw rate satisfies a predetermined yaw rate condition, the stability evaluation module may determine a total amount of time within a predetermined time period that the measured yaw rate satisfies the predetermined yaw rate condition. If either the total amount of time that the measured lateral acceleration satisfies the predetermined lateral acceleration condition or the total amount of time that the measured yaw rate satisfies the predetermined yaw rate condition exceeds a significant proportion of the predetermined time period, the vehicle-trailer system is deemed to be experiencing dynamic instability. In such a case, the stability evaluation module may control operation of the vehicle to generate a stability alert. The stability evaluation module may also implement further responses, such as deactivation of a lane tracing assist system operating as part of an autonomous or semi-autonomous operational mode of the vehicle.

Figure 1:
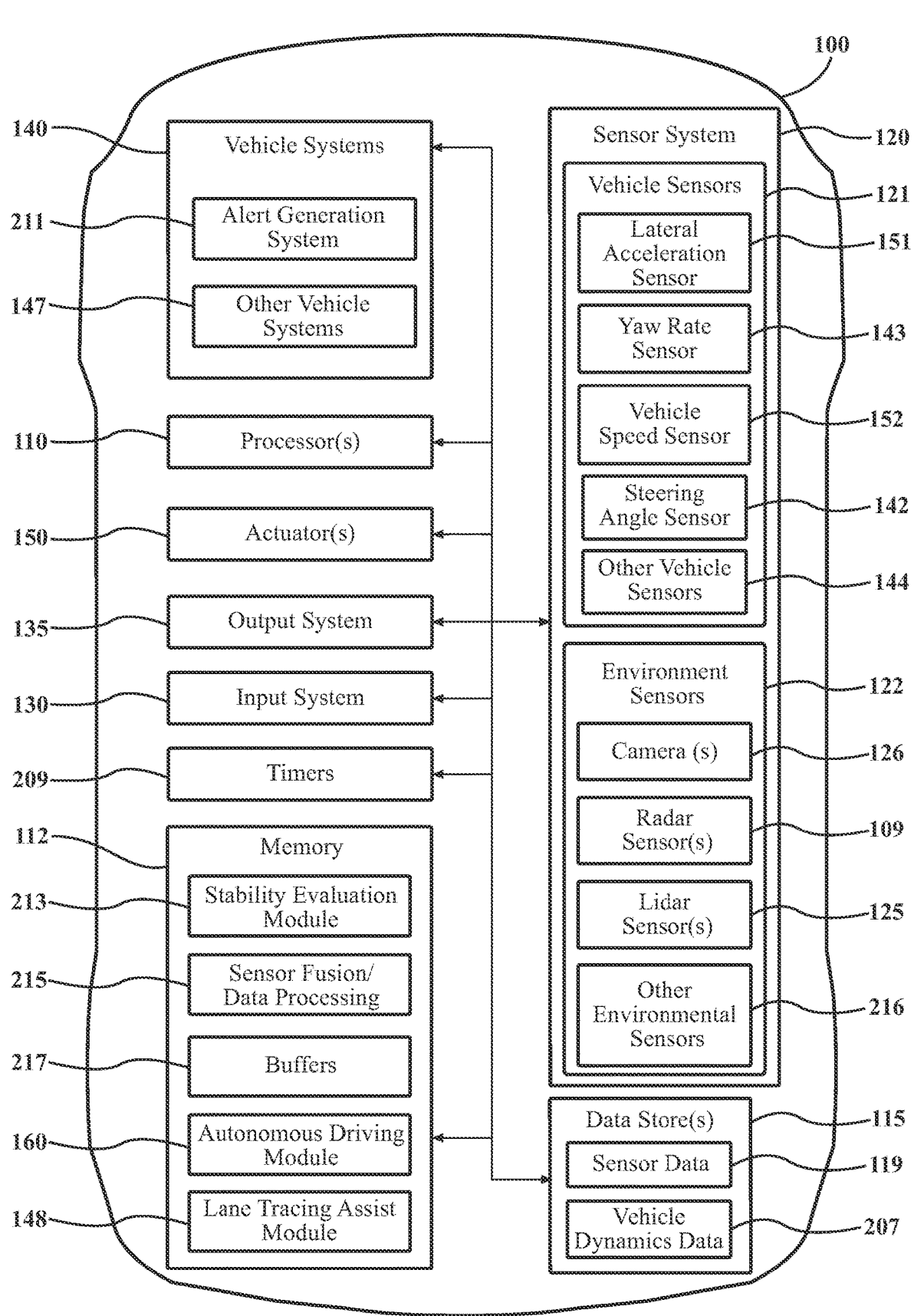
FIG. 1 is a block schematic diagram of a vehicle incor-porating a vehicle-trailer stability monitoring system in accordance with embodiments described herein.

Referring to FIG. 1, an example of a vehicle 100 is illustrated. As used herein, a "vehicle" is any form of motorized transport. In one or more implementations, the vehicle 100 is a passenger vehicle. While arrangements will be described herein with respect to passenger vehicles, it will be understood that embodiments are not limited to passenger vehicles. In some implementations, the vehicle 100 may be any form of motorized transport that benefits from the functionality discussed herein.

The vehicle 100 includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100.

Some of the possible elements of the vehicle 100 are shown in FIG. 1 and will be described with reference thereto. Additionally, it will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

FIG. 1 shows a block schematic diagram of a vehicle 100 incorporating a stability monitoring system usable for detecting an instability condition in a moving vehicle-trailer system, in accordance with embodiments described herein. In some instances, the vehicle 100 may be configured to switch selectively between an autonomous mode, one or more semi-autonomous operational modes, and/or a manual mode. Such switching can be implemented in a manner described herein or in another suitable manner, now known or later developed. "Manual mode" means that all of or a majority of the navigation and/or maneuvering of the vehicle is performed according to inputs received from a user (e.g., human driver). A "semi-autonomous operational mode" may be a mode in which one or more navigating and/or maneuvering function(s) of the vehicle are performed autonomously using computer-readable instructions in implemented by processor(s), while other navigating and/or maneuvering function(s) remain under the control of a human user.

In one or more embodiments, the vehicle 100 is an autonomous vehicle. As used herein, "autonomous vehicle" refers to a vehicle that can operate in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one or more arrangements, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along the travel route. However, even in a highly automated or completely automated vehicle, provisions may be made to enable a human driver to assume steering, throttle, and other controls in the event of an emergency, failure of one or more of the autonomous systems or components, or a driving condition that may require human intervention for reasons of safety or stability.

Embodiments of the stability monitoring system described herein may be configured to detect an instability condition in a moving vehicle-trailer system which includes the vehicle 100. As described herein, a "vehicle-trailer system" may include a vehicle and a trailer connected to the vehicle so as to enable the vehicle to tow the trailer. When the attached trailer is being towed by the vehicle along a road or other surface, the vehicle-trailer system becomes a "moving vehicle-trailer system".

Figures 2, 3:
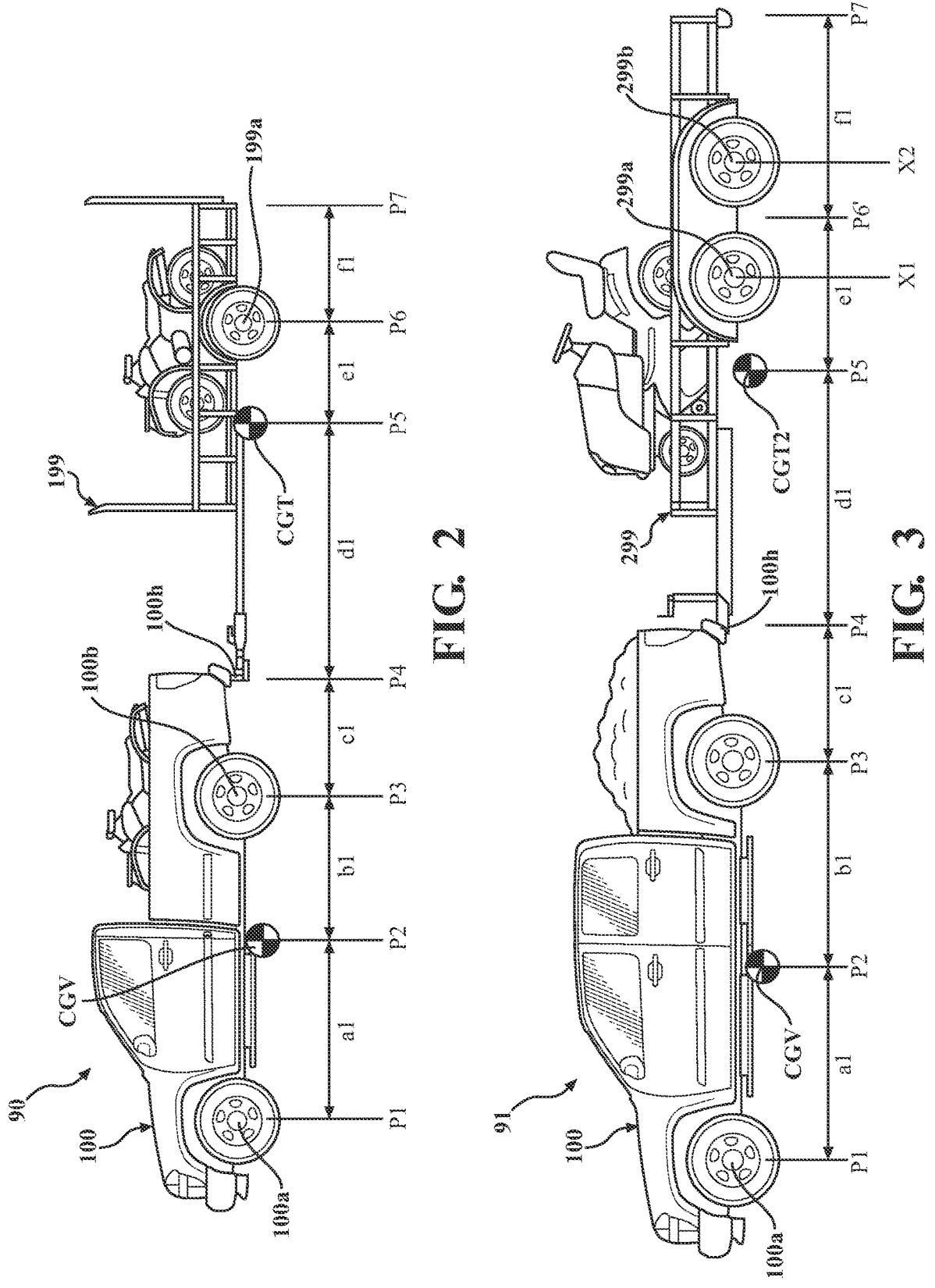
FIG. 2 is a schematic side view of an embodiment of a vehicle-trailer system including a trailer supported by a single axle.
FIG. 3 is a schematic side view of an embodiment of a vehicle-trailer system including a trailer supported by a pair of spaced apart axles.

FIGS. 2 and 3 show examples of vehicle-trailer systems in which an embodiment of the stability monitoring system may be employed. FIG. 2 is a schematic side view of a vehicle-trailer system 90 including a trailer 199 supported by a single axle 199a. FIG. 3 is a schematic side view of a vehicle-trailer system 91 including a trailer 299 supported by a pair of spaced apart axles 299a and 299b. FIGS. 2 and 3 illustrate some key parameters of the vehicle-trailer systems that are relevant to system stability. In FIGS. 2 and 3, it is assumed that the vehicle and trailers are resting on a level or horizontal surface. The key parameters may include:

CGV=a center of gravity of the vehicle 100 in a loaded condition;

CGT1=a center of gravity of the trailer 199 (single axle) in FIG. 2, in a loaded condition;

CGT2=a center of gravity of the trailer 299 (double-axle) in FIG. 3, in a loaded condition;

a1=a horizontal distance from a vertical plane P1 passing through an axis of rotation of the front axle 100a of the vehicle to a vertical plane P2 passing through the center of gravity CGV of the vehicle 100;

b1=a horizontal distance from the vertical plane P2 to a vertical plane P3 passing through an axis of rotation of the rear axle 100*b* of the vehicle;

c1=a horizontal distance from the vertical plane P3 to a vertical plane P4 passing through a center of the trailer hitch 100*h* where the trailer is connected to the hitch;

d1=a horizontal distance from the vertical plane P4 to a vertical plane P5 passing through a center of gravity (CGT1, CGT2) of the loaded trailer;

e1=a horizontal distance from the vertical plane P5 to a vertical plane P6 passing through a rotational axis of the trailer axle 199*a* (for a trailer having a single axle (FIG. 2)), or a horizontal distance from the vertical plane P5 to a vertical plane P6' bisecting a horizontal distance between a vertical plane X1 extending through a first trailer axle 299*a* and another vertical plane X2 extending through a second trailer axle 299*b* (for a trailer having two axles (FIG. 3)); and f1=a horizontal distance from the vertical plane P6 to a rearmost end or edge of the trailer (for a trailer having a single axle) or from the vertical plane P6' to the rearmost end or edge of the trailer (for a trailer having two axles).

Values of these parameters and other parameters may be stored in vehicle dynamics data 207 and/or in other memory locations for use in the computations described herein. Values of these and other parameters may be processed using the various relationships described herein to provide assessments of vehicle-trailer system stability usable for triggering generation of instability alerts and other responses.

The vehicle 100 can include one or more processors 110. In one or more arrangements, the processor(s) 110 can be a main processor(s) of the vehicle 100. For instance, the processor(s) 110 can be an electronic control unit (ECU). The vehicle 100 can include one or more data stores 115 for storing one or more types of data. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operably connected to the processor(s) 110 for use thereby. The term "operably connected," as used throughout this description, can include direct or indirect connections, including connections without direct physical contact.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more cameras 126 of the sensor system 120.

The one or more data store(s) 115 can include vehicle dynamics data 207. Vehicle dynamics data 207 may store values of the various system dynamics parameters previously described with regard to FIGS. 2 and 3, dynamics-related data acquired by the vehicle sensor system 120, and other data related to stability of the vehicle-trailer system.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process. In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operably connected to the processor(s) 110, the data store(s) 115, and/or other element(s) and systems of the vehicle 100 (including any of the elements shown in FIG. 1) for storage and processing of sensor data.

The sensor system 120 can include any suitable type of sensor. Various examples of different types of sensors will be described herein. However, it will be understood that the embodiments are not limited to the particular sensors described. The sensor system 120 may include any sensors suitable for and/or required to perform any of the data acquisition and/or vehicle control operations contemplated herein.

Sensors of sensor system 120 may be communicably coupled to the various systems and components of the vehicle 100. The sensors may also be operably connected to vehicle systems and components, such as data stores 115 and processor(s) 110, for storage and processing of vehicle and environment sensor data. Sensor system 120 may include sensors configured to detect the current state or status of vehicle systems and components and to generate alerts or indications of possible malfunctions of vehicle systems and components.

Sensors of the sensor system 120 may include (or be operably connected to) one or more timers or clocks (such as timers 209) configured for purposes such as tracking the passage of one or more predetermined time periods, determining a time period during which a predetermined condition exists, and acquisition, tracking, storage, generation and/or processing of time-correlated sensor data. Thus, data acquired by the sensors described herein may be monitored and recorded over one or more predetermined time periods to determine time-related variations in the parameters monitored by the sensors.

The sensor system 120 can include one or more vehicle sensors 121. The vehicle sensor(s) 121 may detect, determine, and/or sense information about the vehicle 100 itself and/or any occupants inside the vehicle. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system, tire rotation sensors and/or other suitable sensors. The vehicle sensor(s) 121 can be configured to detect, and/or sense one or more characteristics of the vehicle 100, such as the current geographical location of the vehicle. In one or more arrangements, the vehicle sensor(s) 121 can include a vehicle speed sensor 152 to determine a current speed and acceleration/deceleration of the vehicle 100. The vehicle sensor(s) 121 may include vehicle directional sensors configured to determine a current heading of the vehicle or direction in which the vehicle is pointed. The vehicle sensor(s) 121 may include sensors configured to sense aspects of the vehicle mechanical and electrical components and/or systems, to aid in determining a mechanical condition of the vehicle and existing and/or potential problems with the vehicle.

In one or more arrangements, the vehicle sensors 121 may include a steering angle sensor 142 configured to measure or compute a steering angle δ of the vehicle front or steerable wheels. As is known in the field of vehicle dynamics, the steering angle δ may be defined as an angle between the fore-aft axis of the vehicle as extending from the front of the vehicle, and the direction in which the steered wheels are pointing. The steering angle sensor 142 may also provide the steering wheel's rate of turn, steering wheel angle and other important data. The steering angle sensor 142 may provide a measured steering angle $\delta_m$ for use in vehicle-trailer system stability determinations as described herein.

The vehicle sensors 121 may include a yaw rate sensor 143 configured to measure or compute a yaw rate of the vehicle 100. As is known in the field of vehicle dynamics, the vehicle yaw rate ω may be a rate of change of a direction in which the vehicle is headed, as measured about a vertical axis extending through the vehicle's center of gravity. The yaw rate sensor 143 may provide a measured yaw rate om for use in vehicle-trailer system stability determinations as described herein.

The vehicle sensors 121 may include a lateral acceleration sensor 151 configured to measure or compute a lateral acceleration $a_L$ of the vehicle 100. As is known in the field of vehicle dynamics, the vehicle lateral acceleration is produced by a cornering force which tends to push the vehicle sideways. The cornering force is generated as the vehicle turns. The lateral acceleration sensor 151 may provide a measured lateral acceleration $a_M$ for use in vehicle-trailer system stability determinations as described herein.

Other vehicle sensors 144 may also be incorporated into the vehicle as needed to acquire data related to vehicle-trailer stability and for other purposes.

The sensor system 120 can include one or more environment sensors 122 configured to acquire data of at least a portion of the external environment of the vehicle 100 (e.g., nearby objects). The environment sensors 122 may detect data or information about the external environment in which the vehicle is located or one or more portions thereof. For example, the one or more environment sensors 122 can be configured to detect, quantify and/or sense objects and/or features in at least a portion of the external environment of the vehicle 100 and/or information/data about such objects and/or features. Objects may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, weather conditions, atmospheric pressure, other vehicles, etc. As an example, in one or more arrangements, the environment sensors 122 can include one or more radar sensors 109, one or more LIDAR sensors 125, one or more cameras 126, and/or other types of sensors 216. Environment sensors 122 may be configured to detect aspects of road geometry, road grade/slope, traffic conditions, movements and characteristics of other vehicles, and other external events and conditions.

Environment sensors such as radar sensors 109, LIDAR sensors 125, camera(s) 126, and/or other sensors may also be usable to monitor the speed, acceleration, position, and other characteristics of any other vehicle in close proximity to the vehicle 100. Environment sensors 122 may be configured to detect activation and deactivation of turn signals, brake lights, and other signals mounted on other vehicles or along a road. Environment sensors 122 may be configured to detect the presence of traffic control elements such as traffic lights, signage, etc., and to interpret and process any indications or messages conveyed by such elements.

In particular arrangements, the camera(s) 126 and other environment sensors may be configured to support operation of a known vehicle lane tracing assist (LTA) system. The lane tracing assist system may be configured to autonomously control operation of the vehicle to keep the vehicle centered in the lane in which it is driving when a vehicle cruise control system (not shown) is employed. In one or more arrangements, the lane tracing assist system may include any vehicle-mounted sensors, processor(s), and/or any other elements of the vehicle which may perform (or assist in performing) functions of the lane tracing assist system. One or more aspects of the lane tracing assist system may be embodied in a lane tracing assist (LTA) module 148, stored in memory 112 and described in greater detail below. The lane tracing assist (LTA) module 148 may be configured to control operations of elements of the LTA system in performance of system functions.

The vehicle 100 can include an input system 130. An "input system" includes any device, component, system, element or arrangement or groups thereof that enable information/data to be entered into a machine. For example, the input system 130 may include a keypad, a touch screen or other interactive display, a voice-recognition system and/or any other device or system which facilitates communications between a user and the vehicle. The input system 130 can receive an input from a vehicle occupant (e.g., a driver or a passenger) or a user located remotely from the vehicle 100. The vehicle 100 can also include an output system 135. An "output system" includes any device, component, or arrangement or groups thereof that enable information/data to be presented to a vehicle occupant (e.g., a driver, a vehicle passenger, etc.) or a remote user. Non-exclusive examples of output system components include screen displays, audio speakers, other sound-generating devices (such as horns and chimes), and other devices.

The vehicle 100 can include one or more vehicle systems, collectively designated 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100.

The vehicle systems 140 can include an alert generation system 211. The alert generation system 211 may be operably connected to the vehicle output system 135 to enable alerts and other stability-related information to be communicated to a user. The alert generation system 211 may include dedicated components and/or sub-systems and may also incorporate any other vehicle systems and components needed to generate and/or communicate alerts and other stability-related information to a user. The alert generation system 211 may be controllable by the stability evaluation module 213 for purposes of generating stability alerts and other stability-related communications. An alert may be configured to be continuous or uninterrupted (e.g., perceivable by a human user as a constant warning sound or constantly repeating message), or the alert may be periodic (i.e., configured to repeat at regular time intervals).

The vehicle systems 140 can include other vehicle systems (generally designated 147 and not shown in FIG. 1), including a propulsion system, a braking system, a steering system, a throttle system, a suspension system, a transmission system, a navigation system and/or other systems. Each of these systems may perform an associated known function in the vehicle. Each of these systems may be controllable to at least some degree by the autonomous driving module 160 and/or other modules stored in memory 112.

The various vehicle 140 systems may be configured to cooperate with each other and with other systems and components to control aspects of vehicle operation, as described herein. Each of the other vehicle systems can include one or more devices, components, and/or a combination thereof, now known or later developed.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110, any of the modules stored in memory 112, and/or any other vehicle components or systems. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by processor(s) 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more of data store(s) 115 or another portion of the vehicle 100 may contain such instructions.

Generally, a module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

"Continuous" determination, estimation, calculation, control, acquisition, etc. of the data and parameter values described herein refers to determination, estimation, acquisition, calculation, and control of the data and parameter values as soon as possible in accordance with times required for data and information acquisition, processing and decision-making. These determinations may be made constantly during operation of the vehicle 100. For example, the stability evaluation module 213 may be configured to process data and other information to provide a continuously updated assessment regarding whether or not (as described in block 410 of FIG. 4) a ratio of a difference between the measured yaw rate $\omega_M$ and an expected yaw rate $\omega_E$ to the expected yaw rate $\omega_E$ exceeds a predetermined yaw rate threshold TIY.

In embodiments described herein, a memory 112 may store at least the autonomous driving module 160, a stability evaluation module 213, and a sensor fusion/data processing module 215. The memory 112 is a random-access memory (RAM), read-only memory (ROM), a hard-disk drive, a flash memory, or other suitable memory for storing the modules 160, 213, and 215. The modules 160, 213, and 215 are, for example, computer-readable instructions that when executed by the processor(s) 110, cause the processor(s) 110 to perform the various functions disclosed herein. Additional modules (not shown) may also be stored in memory 112.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc. The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120 and/or information received from a vehicle navigation system (not shown in FIG. 1). "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner.

The autonomous driving module(s) 160 can be configured to execute various vehicle functions and/or to transmit data to, receive data from, interact with, and/or control the vehicle 100 or one or more systems thereof, such as a steering system (not shown) and a throttle system (also not shown). The autonomous driving module(s) 160 may be configured to autonomously control the vehicle 100 so as to drive the vehicle along a travel route, from an initial or start location to a destination.

In one or more arrangements, the vehicle 100 can include a lane tracing assist (LTA) module 148. The lane tracing assist module 148 may be configured to control operation of various elements of the vehicle (e.g., environment sensors 122) to perform lane tracing assist system-related functions. The lane tracing assist module 148 may be configured to cooperate with and/or control a vehicle cruise control system (not shown), the vehicle steering system (not shown), and any other vehicle systems, modules and/or components as required. The lane tracing assist module 148 may be configured to autonomously control operation of pertinent cameras, other sensors and the steering system to keep the vehicle centered in the lane in which it is driving when the cruise control is employed. For example, the lane tracing assist module 148 may be configured to control operation of cameras 126 to monitor the lane markings and another vehicle driving in front of the vehicle 100. A forward-facing camera may display the position of the vehicle 100 within the lane and may be configured to cooperate with autonomous driving module 160 and/or other system(s) that will autonomously apply steering adjustments to keep the vehicle 100 centered in the lane. In alternative arrangements, control functionality for the LTA system may be incorporated into the autonomous driving module 160.

Referring again to FIG. 1, a sensor fusion/data processing module 215 may include an algorithm (or a computing device storing an algorithm) configured to accept data from the sensor system 120 as an input. The data may include, for example, data representing information sensed at the sensors of the sensor system 120. The sensor fusion/data processing module 215 may include or be configured to be executed using, for instance, a Kalman filter, Bayesian network, or other algorithm. The sensor fusion/data processing module 215 may provide various assessments based on the data from sensor system 120. Depending upon the embodiment, the assessments may include evaluations of individual objects and/or features in the environment of vehicle 100, evaluations of particular situations, and/or evaluations of possible impacts based on the particular situation. Other assessments are possible.

The vehicle 100 can include a stability evaluation module 213. Generally, the stability evaluation module 213 may be configured to acquire and/or receive sensor data and parameter values relating to dynamic stability of the vehicle and the vehicle-trailer system. The stability evaluation module 213 may include computer-readable instructions that when executed by the processor(s) 110 cause the processor(s) to use this information to perform certain computations relating to stability of the vehicle and vehicle-trailer system. The stability evaluation module 213 may be configured as described herein to evaluate the results of these computations to determine if an instability condition exists in the vehicle-trailer system. The stability evaluation module 213 may also be configured as described herein to, responsive to a determination that an instability condition exists, autonomously control certain operations of the vehicle 100 to generate instability alerts to users of the vehicle and/or to deactivate certain vehicle systems to facilitate full manual control of the vehicle. These steps may help the user stabilize the motion of the vehicle-trailer system as soon as possible.

It will be understood that, in one or more arrangements, any number (or all of) the vehicle-trailer system stability evaluation modes illustrated in FIGS. 4-11 and described herein may be performed simultaneously during operation of the vehicle in towing the trailer. If any of the stability evaluation mode(s) being implemented reveals a condition calling for activation or deactivation of a stability alert, activation or deactivation of the lane tracing assist system, or implementation of any other action(s) responsive to a determined stability/instability of the vehicle-trailer system, the stability evaluation module 213 may implement such action(s).

In one or more arrangements, the stability evaluation module may include computer-readable instructions that when executed by the processor(s) 110 cause the processor(s) to compute a vehicle dynamics factor $A_v$ for the vehicle 100. The vehicle dynamics factor $A_v$ may describe a relationship between certain structural and spatial parameters of the vehicle that are relevant to vehicle stability during vehicle movement. It has been found that, in one possible arrangement, the vehicle dynamics factor $A_v$ may be expressed in the following form:

$$A_V = \frac{-m_{Veh}}{(a1+b1)^2}\left(\frac{(a1)C_F - (b1)C_R}{C_F C_R}\right) \qquad (1)$$

where:

$m_{veh}$=vehicle mass (in a loaded condition of the vehicle which will be used for towing the trailer);

$C_F$=a stiffness estimate for the front tires; and $C_R$=a stiffness estimate for the rear tires Other relationships expressing the trailer dynamics factor are also usable for the purposes described herein.

Values for the vehicle dynamics factor parameters may be acquired using any suitable method(s). For example, for vehicle mass $m_{veh}$, a standard unloaded weight of the vehicle may be stored in a memory buffer for access by a user and/or the stability evaluation system processor(s). The user may input estimated weights of any cargo and vehicle occupants through the vehicle input system 130. The stability evaluation module 213 may include computer-readable instructions to add the inputted weights to the standard vehicle weight stored in the buffer to generate an estimated loaded vehicle mass. Alternatively, a vehicle electronic control unit (ECU) or an engine control module (ECM) may be configured to estimate loaded vehicle weight based on measurements of engine torque during movement of the vehicle. Estimates for values of the parameters $C_F$ and $C_R$ may be obtained using any of a variety of known methods (for example, longitudinal slip slope-based estimation of the tire stiffness).

Values for the dimensions a1 and b1 may be stored in a memory buffer by the vehicle manufacturer or measured and entered by a user. For extra vehicle loading having a cumulative mass centroid located close to the unloaded vehicle center of gravity and/or for extra loading that is small relative to the mass of the unloaded vehicle, the location of the center of gravity of the loaded vehicle may not vary by a significant amount from location of the center of gravity of the unloaded vehicle. Also, assuming the extra vehicle loads do not shift significantly during movement of the vehicle-trailer system, the location of the center of gravity of the loaded vehicle 100 may not shift significantly.

Values for all the parameters in relationship (1) may be acquired, entered, or otherwise communicated to memory buffer(s). The stability evaluation module 213 may include computer-readable instructions to extract the pertinent stored parameter values from the memory buffer(s) and to use these parameter values to compute the vehicle dynamics factor $A_v$. Parameter values may be updated manually (e.g., by a user through input system 130) and/or automatically (using vehicle sensor data).

In one or more arrangements, the stability evaluation module 213 may include computer-readable instructions that when executed by the processor(s) 110 cause the processor(s) to compute a trailer dynamics factor $A_T$ for the trailer. The trailer dynamics factor $A_T$ may express a relationship between certain structural and spatial parameters of the vehicle-trailer system 99 that are relevant to system stability during movement of the trailer. It has been found that, in one possible arrangement, the trailer dynamics factor $A_T$ may be expressed in the following form:

$$A_T = \frac{m_T g1}{(d1+e1)(a1+b1)^2}\left(\frac{c1}{C_F}+\frac{a1+b1+c1}{C_R}\right) \quad (2)$$

where:

$m_T$=a mass of the trailer in a loaded condition; and $g1=T_{PCT}*(d1+e1)$ (where $T_{PCT}$=a tongue percentage for the trailer (i.e., a proportion of the loaded trailer weight supported by the tongue at the tongue/trailer hitch connection)). In one or more arrangements, $T_{pct}$ may be set at 10% when the trailer is loaded. Trailer hitch down force may be estimated by measuring deflection of the rear suspension. It can also be measured on a scale or calculated by the user. Values of length/distance parameters for a given arrangement may be estimated using data from rear-facing vehicle camera. Other relationships expressing the trailer dynamics factor are also usable for the purposes described herein.

Values for the trailer dynamics factor parameters may be acquired using any suitable method(s). For example, values for the parameters c1 and g1 (which should not vary during movement of the vehicle-trailer system) may be entered by a user and stored in a memory buffer.

The unloaded trailer weight may be provided by the trailer manufacturer and may be entered by a user via the input system 130 and stored in a memory buffer. The user may also enter the weight of the trailer load. Alternatively, a vehicle electronic control unit (ECU) or an engine control module (ECM) may be configured to estimate loaded trailer weight based on measurements of vehicle engine torque during movement of the vehicle with the trailer attached and without the trailer attached.

Values for all the parameters in relationship (2) may be acquired, entered, or otherwise communicated to memory buffer(s). The stability evaluation module 213 may include computer-readable instructions to extract the pertinent stored parameter values from the memory buffer(s) and to use these parameter values to compute the trailer dynamics factor $A_T$.

In one or more arrangements, the stability evaluation 213 module may include computer-readable instructions that when executed by the processor(s) 110 cause the processor(s) to determine a measured steering angle 8M of the vehicle front tires. The measured steering angle $\delta_M$ may be derived from data acquired by steering angle sensor (such as steering angle sensor 142) mounted on the vehicle 100. Raw steering angle data may be filtered in the sensor fusion/data processing module 215, which may include one or more filters (such as low-pass filters) configured for smoothing the data and reducing noise. The filtering process may provide filtered steering angle values for use as the measured steering angles. The measured steering angle may be expressed in (or converted to) radians or some other dimensionless parameter for use in further computations in the processor(s) 110 pursuant to additional computer-readable instructions stored in the stability evaluation module 213.

In one or more arrangements, the stability evaluation module 213 may include computer-readable instructions that when executed by the processor(s) 110 cause the processor(s) to determine if a measured value of at least one stability evaluation parameter satisfies an associated predetermined condition. A "stability evaluation parameter" may be a parameter indicative of the dynamic stability of the moving vehicle-trailer system and which may be evaluated with respect to an associated predetermined condition to determine whether or not generation of a stability alert is advisable. For example, in one or more particular arrangements, the at least one stability evaluation parameter may include a lateral acceleration of the vehicle. A "measured lateral acceleration" $a_M$ of the vehicle 100 may be a lateral acceleration obtained from a sensor (such as lateral acceleration sensor 151) configured to measure or calculate a lateral acceleration of the vehicle, or a lateral acceleration computed using data from a sensor providing information necessary for such a computation.

In one or more particular arrangements, the at least one stability evaluation parameter may include a yaw rate of the vehicle. A "measured yaw rate" $\omega$ of the vehicle 100 may be a yaw rate obtained from a sensor (such as yaw rate sensor 143) configured to measure or calculate a yaw rate of the vehicle, or a yaw rate computed using data from a sensor providing information necessary for such a computation. In one or more examples, the measured lateral acceleration $a_M$ and measured yaw rate $\omega_M$ may each have a data acquisition and processing cycle of 20 milliseconds (i.e., values of the measured lateral acceleration $a_M$ and/or measured yaw rate $\omega_M$ may be acquired by the respective sensors, communicated to the processor(s) 110, and processed for purposes of vehicle-trailer stability evaluation every 20 milliseconds). Alternatively, the acquisition and processing cycle length may be 5 milliseconds, 10 milliseconds, or another value.

In arrangements where the at least one stability evaluation parameter includes a lateral acceleration of the vehicle, the associated predetermined condition may be a predetermined lateral acceleration condition.

In one or more arrangements, the predetermined lateral acceleration condition may be a condition wherein the measured lateral acceleration $a_M$ exceeds a predetermined lateral acceleration threshold T3A (i.e., where $a_M$>T3A). In one or more particular arrangements, the third, predetermined lateral acceleration threshold T3A may be 2.5 meters/second².

In one or more arrangements, the predetermined lateral acceleration condition may be a condition wherein a ratio of a difference between the measured lateral acceleration $a_M$ and an expected lateral acceleration $a_E$ to the expected lateral acceleration $a_E$ exceeds a predetermined lateral acceleration threshold T2A (i.e., where $(a_M-a_E)/a_E$>T2A). A "predetermined lateral acceleration threshold" may be a threshold used in evaluation of the lateral acceleration or in evaluation of a term including the lateral acceleration as a factor. In particular arrangements, the predetermined lateral acceleration threshold T2A may be equal to 50% (i.e., if $(a_M-a_E)/a_E>0.50$, then the second, predetermined lateral acceleration condition is met, where $a_M$=the measured yaw rate and $a_E$=the expected yaw rate).

Regarding the expected lateral acceleration $a_E$ and the expected yaw rate $\omega E$ (described below), in one or more arrangements, the stability evaluation module 213 may include computer-readable instructions that when executed by the processor(s) 110 cause the processor(s) to compute the expected value of at least one stability evaluation parameter using a perceived curve radius $R_P$. For example, the stability evaluation module 213 may include computer-readable instructions that when executed by the processor(s) 110 cause the processor(s) to, using the perceived curve radius $R_P$, compute the expected lateral acceleration $a_E$ of the vehicle (block 442 of FIG. 4). An "expected lateral acceleration" $a_E$ of the vehicle may be a lateral acceleration that is expected based on the speed $v$ of the vehicle 100 during cornering and the previously computed perceived curve radius $R_P$ of the vehicle during cornering. In one or more arrangements, the expected lateral acceleration $a_E$ may be calculated using the following relationship:

$$a_E = v^2/R_p \tag{3}$$

In one or more arrangements, the stability evaluation module 213 may include computer-readable instructions that when executed by the processor(s) 110 cause the processor(s) to compute the perceived curve radius $R_P$ of the vehicle. The perceived curve radius $R_P$ is a derived parameter usable for computing the expected lateral acceleration $a_E$ of the vehicle and the expected yaw rate $\omega_E$ of the vehicle. The vehicle steering angle $\delta$ may be expressed in terms of the parameters $a1$, $b1$, $A_T$, and $A_V$ previously described, as well as the vehicle speed $v$ and a curve radius $R$ of the vehicle, according to the following relationship:

$$\delta = \frac{a1+b1}{R} * \left[1 + v^2(A_V - A_T)\right] \tag{4}$$

Rearranging the parameters in the above relationship (4), the perceived curve radius $R_P$ may be given by the following relationship:

$$R_p = \frac{a1+b1}{\delta_m} * \left[1 + v^2(A_V - A_T)\right] \tag{5}$$

where $\delta_M$ is the previously-determined measured steering angle.

In arrangements where the at least one stability evaluation parameter includes a yaw rate of the vehicle, the associated predetermined condition may be a predetermined yaw rate condition. For example, referring to FIG. 4, in one or more particular arrangements, the predetermined yaw rate condition is a condition wherein a ratio of a difference between the measured yaw rate $\omega_M$ and an expected yaw rate $\omega_E$ to the expected yaw rate $\omega_E$ exceeds a predetermined yaw rate threshold T1Y ((i.e., where $(\omega_M-\omega_E)/\omega_E>T1Y$). A "predetermined yaw rate threshold" may be a threshold used in evaluation of the yaw rate or in evaluation of a term including the yaw rate as a factor. In particular arrangements, the predetermined yaw rate threshold T1Y may be equal to 50% (i.e., if $(\omega_M-\omega_E)/\omega_E>0.50$, then the predetermined yaw rate condition is met, where om is equal to the measured yaw rate and WE is equal to the expected yaw rate).

The stability evaluation module may include computer-readable instructions that when executed by the processor(s) cause the processor(s) to compute the expected yaw rate $\omega_E$ of the vehicle. An "expected yaw rate" $\omega_E$ of the vehicle may be a yaw rate that is expected based on the speed $v$ of the vehicle 100 during cornering and the previously computed perceived curve radius $R_P$ of the vehicle during cornering. In one or more arrangements, the expected yaw rate $\omega_E$ may be calculated using the following relationship:

$$\omega_E = \frac{v}{R_p} \tag{6}$$

One indicator of a possible instability condition in the vehicle-trailer system is a situation where a total amount of time within a predetermined time period that the measured value of a given stability evaluation parameter satisfied the associated predetermined condition exceeds a significant proportion of the predetermined time period. Thus, in one or more arrangements, the stability evaluation module 213 may include computer-readable instructions that when executed by the processor(s) 110 cause the processor(s) to determine a total amount of time within a predetermined time period that the measured value of the stability evaluation parameter satisfied the associated predetermined condition. For example, the stability evaluation module 213 may include computer-readable instructions that when executed by the processor(s) 110 cause the processor(s) to, if the measured lateral acceleration $a_E$ satisfies a predetermined lateral acceleration condition, determine a total amount of time within a predetermined previous or past time period tM that the measured lateral acceleration $a_M$ satisfied the predetermined lateral acceleration condition. The stability evaluation module 213 may also include computer-readable instructions that when executed by the processor(s) cause the processor(s) to, if the measured yaw rate om satisfies the predetermined yaw rate condition, determine a total amount of time within the predetermined previous time period tM that the measured yaw rate $\omega_M$ satisfied the predetermined yaw rate condition.

In one or more particular arrangements, the significant proportion of the predetermined time period tM for either (or both) of the measured lateral acceleration $a_M$ and the measured yaw rate $\omega_M$ may be 20% of the predetermined time period. However, in embodiments described herein, the significant proportion may have any value in the range of 10%-30% (inclusive) of the predetermined time period. The predetermined time period tM may be selected so as to permit at least a predetermined number of data acquisition cycles of the measured lateral acceleration $a_M$ and measured yaw rate $\omega_M$, for comparison and/or evaluation purposes. In one or more particular arrangements, the predetermined time period tM may be equal to 500 milliseconds. This may allow, for example, 25 cycles of data acquisition and processing for the measured yaw rate OM and measured lateral acceleration $a_M$ (assuming a cycle time of 20 milliseconds as previously described).

Predetermined values of various parameters such as thresholds and time periods described herein may be determined in a known manner based on testing of the vehicle and vehicle-trailer arrangements. The values may be specified with a view to ensuring reliable and timely determination of instability conditions, to enable remediative action to be taken.

In one or more arrangements, the stability evaluation module 213 may include computer-readable instructions that when executed by the processor(s) 110 cause the processor(s) to, if the total amount of time (over the predetermined time period) that the measured value of a stability evaluation parameter satisfied the associated predetermined condition exceeds a significant proportion of the predetermined time period, control operation of the vehicle to generate a stability alert. Thus, for example, the stability evaluation module 213 may include computer-readable instructions that when executed by the processor(s) 110 cause the processor(s) to control operation of the vehicle 100 to generate a stability alert if the total amount of time that the measured lateral acceleration $a_M$ satisfied the predetermined lateral acceleration condition and/or the total amount of time that the measured yaw rate $\omega_M$ satisfied the predetermined yaw rate condition exceeds the significant proportion of the predetermined time period tM.

In particular arrangements using yaw rate and lateral acceleration as stability evaluation parameters, "instability" in the vehicle-trailer system may be determined to occur when the total amount of time that the measured lateral acceleration $a_M$ satisfied a predetermined lateral acceleration condition and/or the total amount of time that the measured yaw rate $\omega_M$ satisfied a predetermined yaw rate condition exceeds the significant proportion tLIM of the predetermined time period tM. The stability evaluation module 213 may be configured to control operation of the vehicle 100 to generate a stability alert responsive to detection of an instability condition.

Stability alerts may be in any form (or forms) that may be perceivable by a user. For example, the alerts may be audible, haptic, visual, or any combination thereof. Stability alerts may be communicated to a user through the output system which may, for purposes described herein, include audio-visual displays, vibration-inducing mechanisms incorporated into vehicle seats or steering wheels, audio speakers incorporated into the vehicle or operable through an application installed on a user's cellular phone, and any of a variety of other alert communication mechanisms and methods. The stability evaluation module may "generate" an alert by producing the alert or causing an alert to be produced, for example, by activating a warning light or generating a message configured to be audible or visible via the vehicle output system. An alert may be considered "activated" when it is expressed in a form configured to be perceivable by human senses, and "deactivated" when generation of the alert is discontinued.

Stability alerts may be configured to communicate to a user that an instability condition exists in the vehicle-trailer system. One or more alerts may be configured to communicate to the user that, as a result of the instability condition, full steering control will be transferred to the user within a stated time period (e.g., 10 seconds) of communication of the instability message. In some arrangements, the alerts may include (or be accompanied by) audible suggestions for alleviating the instability condition. Examples of such suggestions include a suggestion to slow the vehicle 100, and a suggestion to stop the vehicle and adjust (if possible) the positioning of trailer cargo to correspondingly adjust a location of the loaded trailer center of gravity and/or the tongue percentage in a manner intended to increase dynamic stability of the system.

In one or more arrangements, the stability evaluation module 213 may include computer-readable instructions that when executed by the processor(s) 110 cause the processor(s) to, in addition to generating a stability alert, control operation of the vehicle 100 so as to deactivate (or suspend operation of) the lane tracing assist (LTA) system. If an instability condition is detected in the vehicle-trailer system, manual control of the vehicle 100 may be required for correcting the condition (for example, by slowing the vehicle down, by implementing specific steering adjustments, by pulling the vehicle off the road to adjust load distribution, etc.). Deactivating the lane tracing assist system may enable full driver control of the steering system, without interference from the vehicle.

The processor(s) 110, the autonomous driving module 160, the stability evaluation module 213 and/or other modules described herein can be operably connected to communicate with each other and with the other elements of the vehicle, including various vehicle systems 140 and/or individual components thereof. For example, referring to FIG. 1, the processor(s) 110 and the autonomous driving module(s) 160 can be in communication to send and/or receive information from the various vehicle systems 140 to control the movement, speed, maneuvering, heading, direction, etc. of the vehicle 100. The processor(s) 110, the autonomous driving module(s) 160, the stability evaluation module 213 and/or other elements of the vehicle may control some or all of the vehicle systems 140 and, thus, may be partially or fully autonomous.

The processor(s) 110 and the autonomous driving module(s) 160 may be operable (in cooperation with a navigation system) to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels).

FIGS. 4-11 are schematic flow diagrams illustrating operation of a stability monitoring system in accordance with one or more embodiments described herein. Prior to engagement of the stability monitoring system, either of the vehicle-trailer systems 98, 99 may be moving along a road surface. In one or more arrangements, the stability monitoring system may be configured to engage or start operation when the vehicle-trailer system reaches a predetermined minimum speed.

Figure 4:
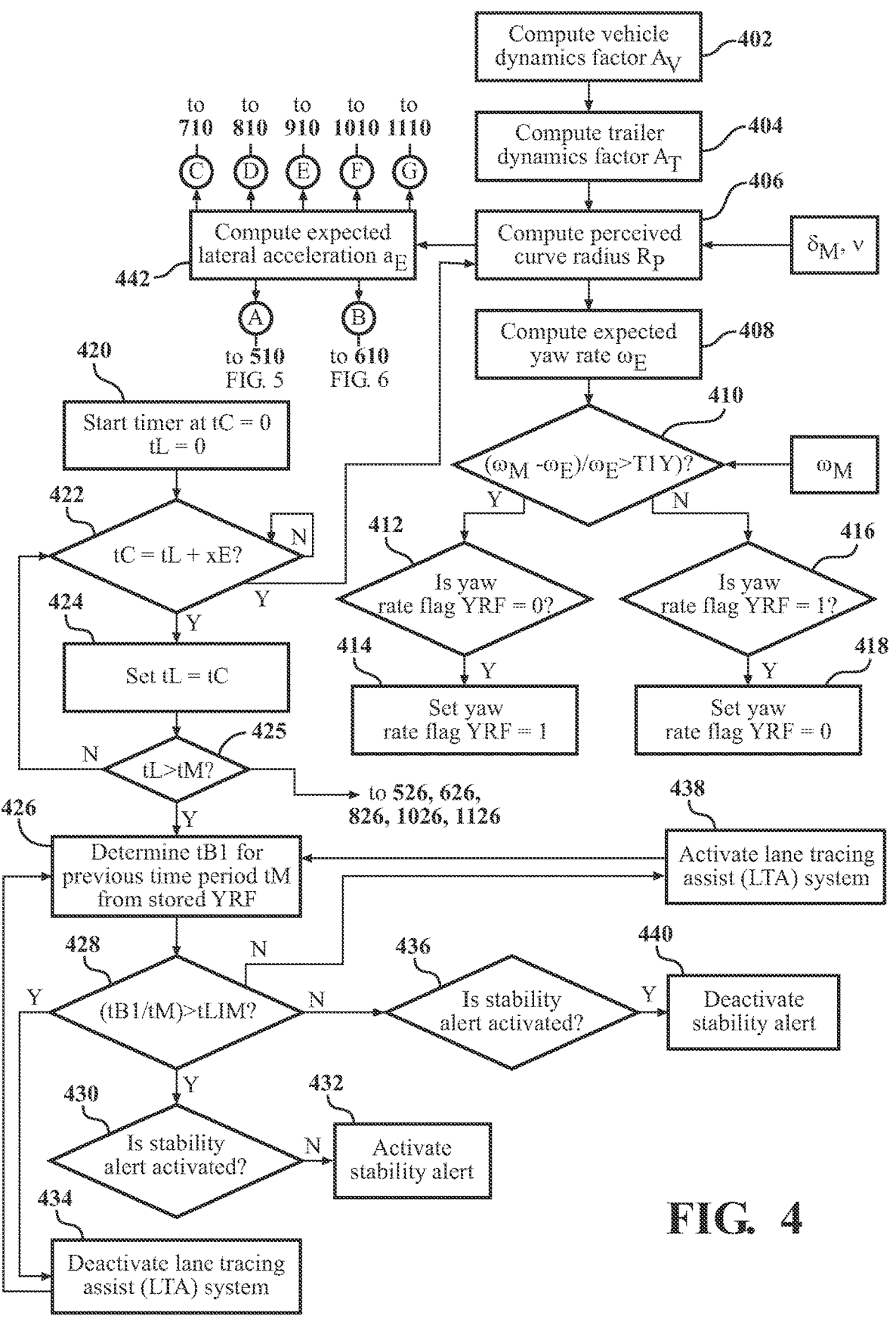
FIG. 4 is a flow diagram illustrating operation of one aspect of the vehicle-trailer stability monitoring system, based on use of a measured vehicle yaw rate as a vehicle-trailer stability criterion.

Referring to FIG. 4, in block 402, using values of the vehicle dynamics parameters previously discussed with regard to FIGS. 2 and 3, the stability evaluation module 213 may compute the vehicle dynamics factor $A_V$ for the vehicle 100 in accordance with relationship (1) (i.e., the processor(s) 110 may execute instructions stored in the stability evaluation module 213 for computing the vehicle dynamics factor $A_V$). In block 404, using values of the trailer and vehicle parameters previously discussed with regard to FIGS. 2 and 3, the stability evaluation module 213 may similarly compute the trailer dynamics factor $A_T$ for the trailer (either 199 or 299) attached to the vehicle 100, in accordance with relationship (2). Calculated values of the vehicle dynamics factor $A_V$ and trailer dynamics factor $A_T$ may be stored in a memory (such as vehicle dynamics data 207 in data stores 115 or in one of buffers 217 in memory 112) for use in further computations as described herein.

In block 406, using the vehicle dynamics factor $A_V$, the trailer dynamics factor $A_T$, the vehicle speed v (from a vehicle speed sensor) and the measured steering angle $\delta_m$ determined from sensor data, the stability evaluation module 213 may compute a perceived curve radius $R_P$ of the vehicle in accordance with relationship (5). The stability evaluation module 213 may then (in block 408), using the perceived curve radius $R_P$, compute an expected yaw rate $\omega_E$ of the vehicle 100 in accordance with relationship (5). Following computation of the expected yaw rate $\omega_E$ in block 408, the stability evaluation module 213 may (in block 410), using the measured yaw rate om determined using data from yaw rate sensor 143, determine if a predetermined yaw rate condition is currently met (in this case, a condition wherein a ratio of a difference between the measured yaw rate OM and an expected yaw rate OF to the expected yaw rate OF exceeds a predetermined yaw rate threshold T1Y ((i.e., where $(\omega_M-\omega_E)/\omega_E > T1Y$). For purposes of determining if the predetermined yaw rate condition is currently met, a most recently measured yaw rate $\omega_M$ may be stored in memory for use in the computation.

A yaw rate flag YRF may have a status value indicating whether or not a predetermined yaw rate condition is currently met. The YRF value may be set to "0" if the predetermined yaw rate condition is not currently met, and to "1" if the predetermined yaw rate condition is currently met. If the predetermined yaw rate condition is determined to be met in block 410, the stability evaluation module 213 may (in block 412) determine if the value of the yaw rate flag YRF is set to "0". If the flag value is set to "0", the stability evaluation module 213 may (in block 414) set the YRF value to "1" (since the predetermined yaw rate condition is met).

Returning to block 410, if the predetermined yaw rate condition is not met, the stability evaluation module 213 may (in block 416) determine if the value of the yaw rate flag YRF is set to "1". If the flag value is set to "1", the stability evaluation module 213 may (in block 418) set the YRF value to "0" (since the predetermined yaw rate condition is not met).

As described herein, blocks 406-418 may be performed at regular evaluation time intervals of xE to update the status of the yaw rate flag YRF as needed. The time-dependent values of YRF may be stored in a memory, along with a time value associated with each YRF value. Using this information, the time period(s) during which the predetermined yaw rate condition is met and the total time during which the predetermined yaw rate condition is met can be determined for evaluation purposes. In this manner, data regarding the status of the flag YRF may be stored for evaluation, to determine if a stability alert should be generated (or an existing stability alert discontinued).

Returning to block 406, simultaneously with computation of the expected yaw rate $\omega_E$ and the expected lateral acceleration ag in blocks 408 and 442, the stability evaluation module 213 may (in block 420) start a timer to track a current elapsed time tC. The value tC of the timer and the value of an associated parameter tL may be set to zero prior to starting the timer. The parameter tL may represent the time at which a most recent evaluation of a yaw rate flag status YRF (in block 410) occurred and the time at which a most recent evaluation of a test condition (in blocks 426, 428, described below) controlling the alert status of the stability monitoring system occurred.

Referring to block 422, the current elapsed time tC may increment until a new time period of xE has elapsed (i.e., until tC=tL+xE). The parameter xE may be a time interval used for regularly updating the yaw rate flag status YRF, for evaluating the yaw rate flag status YRF, and for evaluating (and updating as needed) the alert status of the stability monitoring system. In one or more arrangements, xE=10 milliseconds. However, XE may be 5 milliseconds, 20 milliseconds, or any other desired value.

Thus, when tC has been incremented by xE (i.e., when tC=(L+xE), the stability evaluation module 213 may (in block 424) set tL=tC, to update tL as a baseline for further incrementing in timer block 422. In addition, when tC has been incremented by xE in block 422, control may transfer back to block 406 so that the perceived curve radius $R_P$ may be re-computed/updated using the values of measured steering angle 8M and vehicle velocity v measured at the latest current time tC. Following this, blocks 408-418 may be repeated as previously described to update the yaw rate flag status YRF for the latest current time tC. Measured data from the vehicle sensors may be time-stamped with an associated time indicated by the timer block 422, so that data from different sensors and calculated values using the time-stamped data may be time-correlated (i.e., so that all measured data (e.g., values of $\delta_M$, v, $\omega_M$) and computed parameter values (e.g., $\omega_E$, YRF) may be associated with a corresponding point in time). In this manner, the yaw flag status YRF may be updated after passage of every time period xE.

Also, when tC has been incremented by xE in block 422, control may transfer to block 425 to determine if the latest value of tL is greater than tM. The parameter tM may represent a time period over which the yaw rate flag status YRF is to be evaluated for purposes of determining whether or not an instability condition exists in the vehicle-trailer system. That is, the yaw rate flag status YRF over the most recent time period tM is evaluated to determine if a need exists to generate a stability alert (or to take some other action responsive to the instability condition). Thus, a sufficient amount of yaw rate flag status information (i.e., an amount gathered over a time period of at least tM) must be generated by repeated execution of blocks 406-418 during incrementing of the current time tC in blocks 422 and 424, before the YRF information can be evaluated to determine whether or not an instability condition exists.

In one or more arrangements, the value of the parameter tM may be constant and may be programmed into the stability monitoring system by an OEM, for example. The value of the parameter tM may be tailored according to the known and/or estimated dynamic characteristics of a particular vehicle, characteristics of the sensors incorporated into the vehicle, and other pertinent factors. In one example, in one or more arrangements, the value of the parameter tM may be set to 500 milliseconds. In other arrangements, the value of the parameter tM may vary according to the particular stability condition being evaluated. For example, the value of tM for a stability condition relating to yaw rate may be different from the value of tM for a stability condition relating to lateral acceleration. This capability may enable the evaluation time period tM to be "tuned" for stability conditions and/or parameters that may be more (or less) volatile or sensitive to environmental condition, to enable closer monitoring of how such conditions are varying during motion of the vehicle-trailer system.

If (in block 425) the latest value of tL is not greater than tM, then control may pass back to block 422, where the timer may continue to increment in blocks 422, 424 and new YRF information may continue to be stored in memory by execution of blocks 406-418 until tL>tM. Thus, while the elapsed time tC is incrementing to a value of at least tM in blocks 420-425, yaw rate flag values are being collected over a time period of at least tM in blocks 406-418. For example, when the timer has run to where tL=440 milliseconds and tM=500 milliseconds, then less than 500 milliseconds of YRF information will have been compiled by execution of blocks 406-418. Since the YRF information is to be evaluated over a period of 500 milliseconds, there will be insufficient YRF information stored in memory for evaluation.

If tL>tM in block 425, the elapsed time will have surpassed tM, and yaw rate flag information for at least the previous time period tM will have been collected (i.e., sufficient yaw rate flag information will have been collected for evaluation). For example, when the timer has run to where tL=540 milliseconds and tM=500 milliseconds, then more than 500 milliseconds of YRF information will have been compiled by execution of blocks 406-418. Then control may transfer to block 426, where the stability evaluation module 213 may be configured to determine the total time tB1 and determine the quotient tB1/tM. The stability evaluation module 213 may determine (from the stored YRF information) a total time tB1, during the last tM, that the yaw rate flag status YRF was equal to "1". Thus, for example, where tM=500 milliseconds, the yaw rate flag status YRF may have been equal to "1" for a total of 300 milliseconds over the last 500 milliseconds of elapsed time. In this case, the quotient tB1/tM=300/500=0.6.

The stability evaluation module 213 may be configured to (in block 428) determine if the quotient tB1/tM satisfies the relationship (tB1/tM)>tLIM. The parameter tLIM may represent a threshold for the quotient tB1/tM above which a stability alert becomes advisable (i.e., if the yaw rate flag was "1" for a high enough proportion of the previous time period tM, then the stability of the vehicle-trailer system is deemed problematic enough so that a stability alert becomes advisable). For example, if the yaw rate flag YRF was "1" for a total of 300 milliseconds out of the last 500 milliseconds (where tM=500 milliseconds) and tLIM=0.5, then 300/500=0.6. Since 0.6>0.50, a stability alert may be deemed advisable.

If it is determined in block 428 that tB1/tM>tLIM and that a stability alert is advisable, the stability evaluation module 213 may be configured to (in block 430) determine if a stability alert is currently activated. The stability evaluation module 213 may be configured to (in block 432, if a stability alert is not currently activated) activate a stability alert. The stability evaluation module 213 may also be configured to (simultaneously with execution of block 430) deactivate a lane tracing assist system of the vehicle (in block 434). Control may then return to block 426, where the stability evaluation module 213 may then update the value of tB1, and then update the quotient tB1/tM (block 428) (i.e., because tB1 is equal to the total time during the most recent previous time period tM that the yaw rate flag status YRF was equal to "1", the values of tB1 and tM may change over time).

Returning to block 428, if it is determined in block 428 that tB1/tM is not >tLIM and that a stability alert is not needed, control may pass to block 436, where the stability evaluation module 213 may be configured to determine if a stability alert is currently activated. The stability evaluation module 213 may be configured to (in block 440, if a stability alert is currently activated but is not needed) deactivate the stability alert. The stability evaluation module 213 may also be configured to (in block 438, simultaneously with execution of block 436) activate the lane tracing assist system of the vehicle. Control may then return to block 426, where the stability evaluation module 213 may then update the value of tB1, and then update the quotient tB1/tM (block 428) as previously described.

Thus, as just described, once block 426 begins to execute (i.e., after tL>tM), the steps in blocks 426, 428 and 430-434 (or blocks 426, 428 and 436-440) will repeat every time period xE, and the proportion of time during the most recent time period tM that the yaw rate flag YRF was "1" will be redetermined, to update the alert status on an "as needed" basis.

Figure 5:
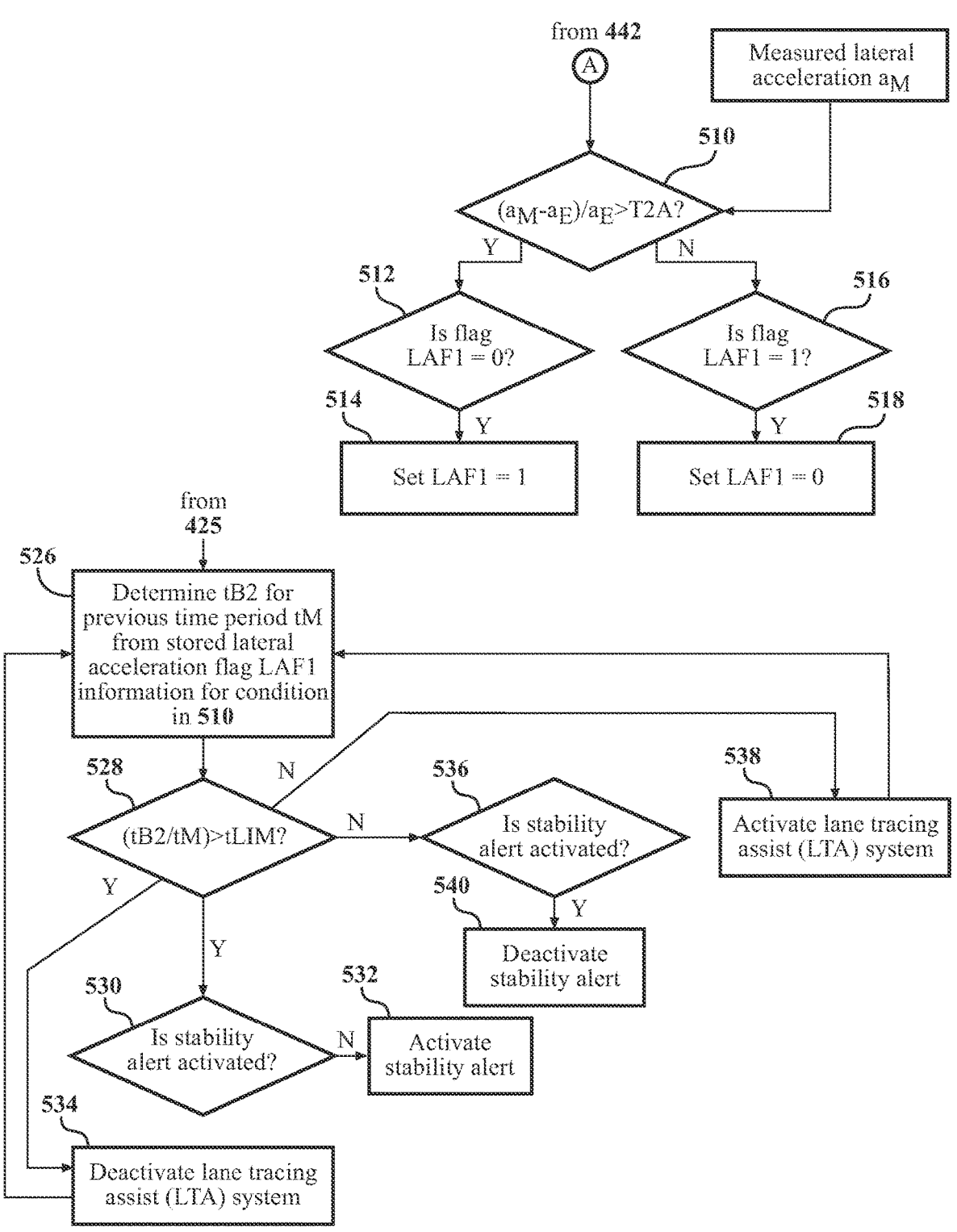
FIG. 5 is a flow diagram illustrating operation of another aspect of the vehicle-trailer stability monitoring system, based on use of a measured vehicle lateral acceleration as a vehicle-trailer stability criterion.

Referring now to FIGS. 4 and 5, in one or more arrangements, the stability evaluation module 213 may be configured to evaluate the measured lateral acceleration $a_M$ with respect to a second, predetermined lateral acceleration threshold T2A to determine if an instability condition exists in the vehicle-trailer system. To this end, simultaneously with determination of the expected yaw rate $\omega_E$ of the vehicle 100 in block 408, the stability evaluation module 213 may (in block 442), using the perceived curve radius $R_P$ compute an expected lateral acceleration $a_E$ of the vehicle 100 in accordance with relationship (4).

Following computation of the expected lateral acceleration $a_E$ in block 442, the stability evaluation module 213 may (in block 510), using the measured lateral acceleration $a_M$ determined using data from lateral acceleration sensor 151, determine if a first predetermined lateral acceleration condition is currently met (in this case, a condition wherein a ratio of a difference between the measured lateral acceleration $a_M$ and an expected lateral acceleration $a_E$ to the expected lateral acceleration $a_E$ exceeds a predetermined lateral acceleration threshold T2A (i.e., where $(a_M-a_E)/a_E>T2A$). For purposes of determining if the first predetermined lateral acceleration condition is currently met, a most recently measured lateral acceleration $a_M$ may be stored in memory for use in the computation.

A lateral acceleration flag LAF1 may have a status value indicating whether or not the first predetermined lateral acceleration condition is currently met. The LAF1 value may be set to "0" if the first predetermined lateral acceleration condition is not currently met, and to "1" if the first predetermined lateral acceleration condition is currently met. If the first predetermined lateral acceleration condition is determined to be met in block 510, the stability evaluation module 213 may (in block 512) determine if the value of the lateral acceleration flag LAF1 is set to "0". If the flag value is set to "0", the stability evaluation module 213 may (in block 514) set the LAF1 value to "1" (since the predetermined lateral acceleration condition is met).

Returning to block 510, if the predetermined lateral acceleration condition is not met, the stability evaluation module 213 may (in block 516) determine if the value of the lateral acceleration flag LAF1 is set to "1". If the flag value is set to "1", the stability evaluation module 213 may (in block 518) set the LAF1 value to "0" (since the predetermined lateral acceleration condition is not met).

In the manner previously described, blocks 406, 442, and 510-518 may be performed at regular evaluation time intervals of xE to update the status of the lateral acceleration flag LAF1 as needed. The stored time-dependent values of LAF1 may be stored in a memory, along with a time value associated with each LAF1 value. Using this information, the time period(s) during which the first predetermined lateral acceleration condition is met and the total time during which the first predetermined lateral acceleration condition is met can be determined for evaluation purposes. In this manner, data regarding the status of the flag LAF1 may be stored for evaluation, to determine if a stability alert should be generated (or an existing stability alert discontinued).

In addition, as previously described with respect to yaw rate flag YRF values in blocks 408-418, lateral acceleration flag LAF1 values are being collected over a time period of at least tM in blocks 442-518 while the elapsed time tC is incrementing to a value of at least tM in blocks 420-425. This ensures that a sufficient amount of lateral acceleration flag LAF1 information is available for evaluation for purposes of determining if a stability alert is required. For example, when the timer has run to where tL=540 milliseconds and tM=500 milliseconds, then more than 500 milliseconds of LAF1 information will have been compiled by execution of blocks 406, 442, and 510-518. Also, following recalculation of the perceived curve radius $R_P$ in block 406 after passage of each time interval xE, the expected lateral acceleration $a_E$ may be recomputed as previously described with respect to recomputation of the expected yaw rate $\omega_E$.

When (in block 425) tL>tM, control may transfer to block 526, where the stability evaluation module 213 may be configured to determine the total time tB2 and determine the quotient tB2/tM. The stability evaluation module 213 may determine (from the stored lateral acceleration flag LAF1 information) a total time tB2, during the last tM, that the lateral acceleration flag status LAF1 was equal to "1". Thus, for example, where tM=500 milliseconds, the lateral acceleration flag status LAF1 may have been equal to "1" for a total of 300 milliseconds over the last 500 milliseconds of elapsed time. In this case, the quotient tB1/tM=300/500=0.6.

The stability evaluation module 213 may be configured to (in block 528) determine if the quotient tB2/tM satisfies the relationship (tB2/tM)>tLIM, in a manner similar to that previously described with respect to block 428. For example, if the lateral acceleration flag status LAF1 was "1" for a total of 300 milliseconds (i.e., if tB2=300 milliseconds) out of the last 500 milliseconds (where tM=500 milliseconds) and tLIM=. 5, then 300/500=0.6. Since 0.6>0.50, the relationship (tB2/tM)>tLIM is satisfied and a stability alert may be deemed advisable.

If it is determined in block 528 that tB2/tM>tLIM and that a stability alert is advisable, the stability evaluation module 213 may be configured to (in block 530) determine if a stability alert is currently activated. The stability evaluation module 213 may be configured to (in block 532, if a stability alert is not currently activated) activate a stability alert. The stability evaluation module 213 may also be configured to (simultaneously with execution of block 530) deactivate a lane tracing assist system of the vehicle (in block 534). Control may then return to block 526, where the stability evaluation module 213 may then update the value of tb2 and then update the quotient tB2/tM (block 528) (i.e., because tB2 is equal to the total time during the most recent previous time period tM that the lateral acceleration flag status LAF1 was equal to "1", the values of tB2 and tM may change over time).

Returning to block 528, if it is determined in block 528 that tB2/tM is not >tLIM and that a stability alert is not needed, control may pass to block 536, where the stability evaluation module 213 may be configured to determine if a stability alert is currently activated. The stability evaluation module 213 may be configured to (in block 540, if a stability alert is currently activated but is not needed) deactivate the stability alert. The stability evaluation module 213 may also be configured to (in block 538, simultaneously with execution of block 536) activate the lane tracing assist system of the vehicle. Control may then return to block 526, where the stability evaluation module 213 may then update the value of tB2, and then update the quotient tB2/tM (block 528) as previously described.

Thus, as just described, once block 526 begins to execute (i.e., after tL>tM), the steps in blocks 526, 528 and 530-534 (or blocks 526, 528 and 536-540) will repeat every time period xE, and the proportion of time during the most recent time period tM that the lateral acceleration flag LAF1 was "1" will be determined, to update the alert status on an "as needed" basis.

Figure 6:
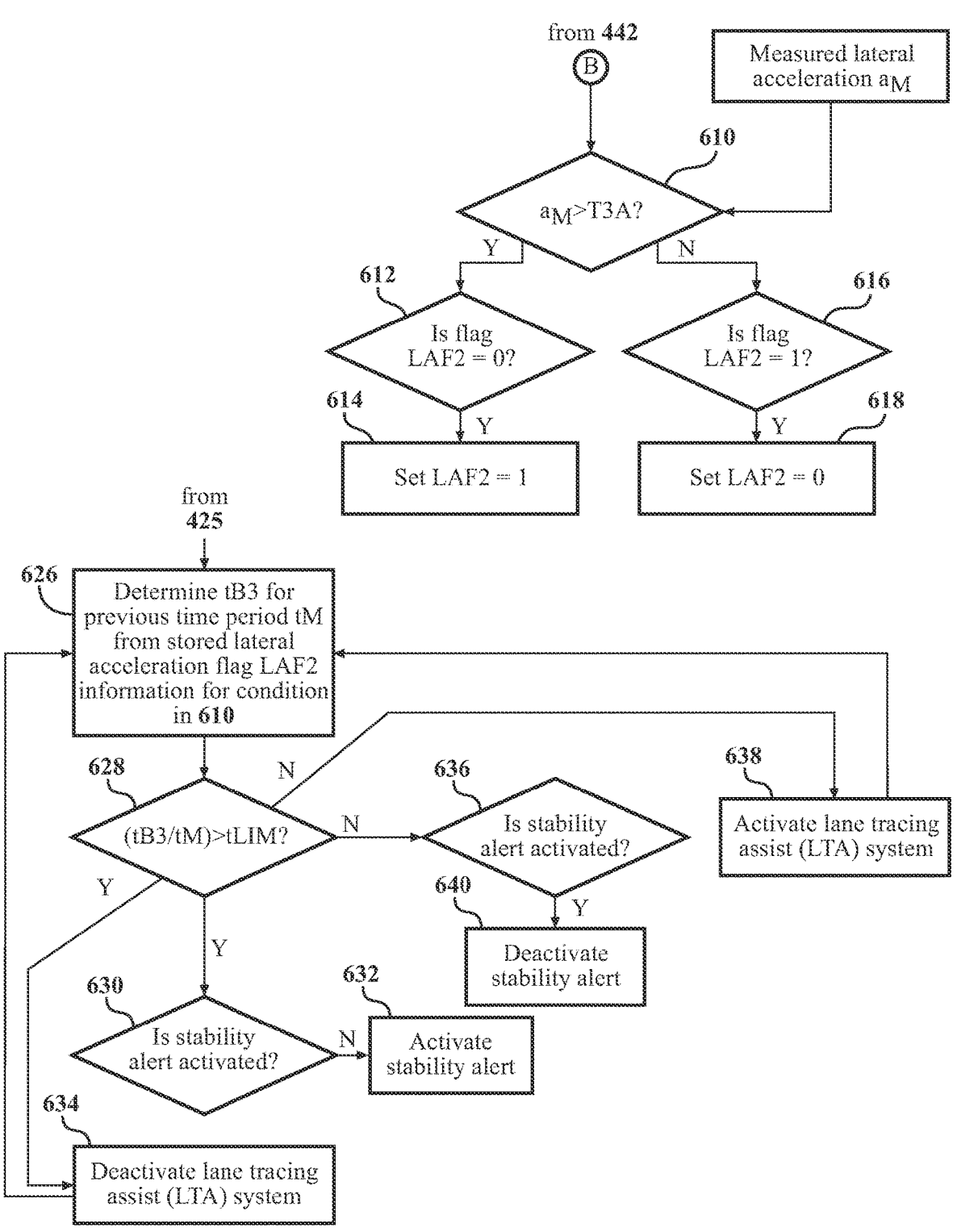
FIG. 6 is a flow diagram illustrating operation of yet another aspect of the vehicle-trailer stability monitoring system, also based on use of the measured vehicle lateral acceleration as a vehicle-trailer stability criterion.

Referring now to FIGS. 4 and 6, in one or more arrangements, the stability evaluation module 213 may be configured to evaluate the measured lateral acceleration $a_M$ with respect to a third, predetermined lateral acceleration threshold T3A to determine if an instability condition exists in the vehicle-trailer system. To this end, simultaneously with using the measured lateral acceleration $a_M$ and the expected lateral acceleration $a_E$ to evaluate the condition in block 510, determine (in block 610) if a second predetermined lateral acceleration condition is currently met (in this case, a condition wherein the expected lateral acceleration ax exceeds a predetermined threshold value T3A (i.e., "$a_E$>T3A")). For purposes of determining if the second predetermined lateral acceleration condition is currently met, a most recently measured lateral acceleration ay may be stored in memory for use in the computation.

A lateral acceleration flag LAF2 may have a status value indicating whether or not the second predetermined lateral acceleration condition is currently met. The LAF2 value may be set to "0" if the second predetermined lateral acceleration condition is not currently met, and to "1" if the second predetermined lateral acceleration condition is currently met. If the second predetermined lateral acceleration condition is determined to be met in block 610, the stability evaluation module 213 may (in block 612) determine if the value of the lateral acceleration flag LAF2 is set to "0". If the flag value is set to "0", the stability evaluation module 213 may (in block 614) set the LAF2 value to "1" (since the second predetermined lateral acceleration condition is met).

Returning to block 610, if the second predetermined lateral acceleration condition is not met, the stability evaluation module 213 may (in block 616) determine if the value of the lateral acceleration flag LAF1 is set to "1". If the flag value is set to "1", the stability evaluation module 213 may (in block 618) set the LAF1 value to "0" (since the second predetermined lateral acceleration condition is not met).

In the manner previously described, blocks 406, 442, and 610-618 may be performed at regular evaluation time intervals of xE to update the status of the lateral acceleration flag LAF2 as needed. The stored time-dependent values of LAF2 may be stored in a memory, along with a time value associated with each LAF2 value. Using this information, the time period(s) during which the second predetermined lateral acceleration condition is met and the total time during which the second predetermined lateral acceleration condition is met can be determined for evaluation purposes. In this manner, data regarding the status of the flag LAF2 may be stored for evaluation to determine if a stability alert should be generated (or an existing stability alert discontinued).

In addition, as previously described with respect to lateral acceleration flag LAF1 values in blocks 510-518, lateral acceleration flag LAF2 values are being collected over a time period of at least tM in blocks 406, 442, and 610-618 while the elapsed time tC is incrementing to a value of at least tM in blocks 420-425. This ensures that a sufficient amount of lateral acceleration flag LAF2 information is available for evaluation for purposes of determining if a stability alert is required. For example, when the timer has run to where tL=540 milliseconds and tM=500 milliseconds, then more than 500 milliseconds of LAF2 information will have been compiled by execution of blocks 406, 442, and 510-518.

When (in block 425) tL>tM, control may transfer to block 626, where the stability evaluation module 213 may be configured to determine the total time tB3 and determine the quotient tB3/tM. The stability evaluation module 213 may determine (from the stored lateral acceleration flag LAF2 information) a total time tB3, during the last tM, that the lateral acceleration flag status LAF2 was equal to "1". Thus, for example, where tM=500 milliseconds, the lateral acceleration flag status LAF2 may have been equal to "1" for a total of 300 milliseconds over the last 500 milliseconds of elapsed time. In this case, the quotient tB1/tM=300/500=0.6.

The stability evaluation module 213 may be configured to (in block 628) determine if the quotient tB3/tM satisfies the relationship (tB3/tM)>tLIM, in a manner similar to that previously described with respect to block 528. For example, if the lateral acceleration flag status LAF2 was "1" for a total of 300 milliseconds (i.e., if tB3=300 milliseconds) out of the last 500 milliseconds (where tM=500 milliseconds) and tLIM=0.5, then 300/500=0.6. Since 0.6>0.50, the relationship (tB3/tM)>tLIM is satisfied and a stability alert may be deemed advisable.

If it is determined in block 628 that tB3/tM>tLIM and that a stability alert is advisable, the stability evaluation module 213 may be configured to (in block 630) determine if a stability alert is currently activated. The stability evaluation module 213 may be configured to (in block 632, if a stability alert is not currently activated) activate a stability alert. The stability evaluation module 213 may also be configured to (simultaneously with execution of block 630) deactivate a lane tracing assist system of the vehicle (in block 634). Control may then return to block 626, where the stability evaluation module 213 may then update the value of tb3, and then update the quotient tB3/tM (block 628) (i.e., because tB3 is equal to the total time during the most recent previous time period tM that the lateral acceleration flag status LAF2 was equal to "1", the values of tB3 and tM may change over time).

Returning to block 628, if it is determined in block 428 that tB3/tM is not >tLIM and that a stability alert is not needed, control may pass to block 636, where the stability evaluation module 213 may be configured to determine if a stability alert is currently activated. The stability evaluation module 213 may be configured to (in block 640, if a stability alert is currently activated but is not needed) deactivate the stability alert. The stability evaluation module 213 may also be configured to (in block 638, simultaneously with execution of block 636) activate the lane tracing assist system of the vehicle. Control may then return to block 626, where the stability evaluation module 213 may then update the value of tB3, and then update the quotient tB3/tM (block 628) as previously described.

Thus, as just described, once block 626 begins to execute (i.e., after tL>tM), the steps in blocks 626, 628 and 630-634 (or blocks 626, 628 and 636-640) will repeat every time period xE, and the proportion of time during the most recent time period tM that the lateral acceleration flag LAF2 was "1" will be determined, to update the alert status on an "as needed" basis.

Figure 7:
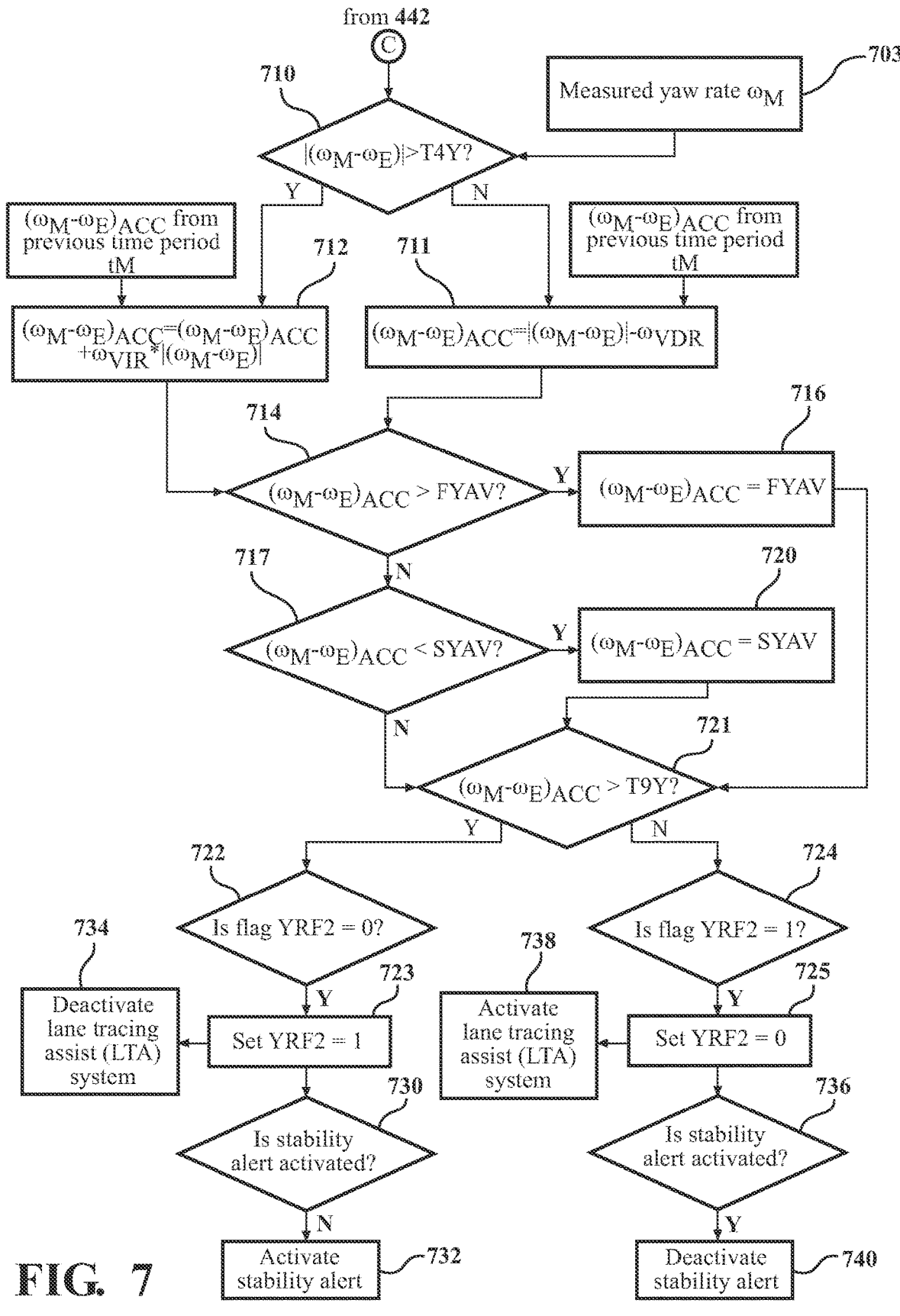
FIG. 7 is a flow diagram illustrating operation of yet another aspect of the vehicle-trailer stability monitoring system, also based on use of a measured vehicle yaw rate as a vehicle-trailer stability criterion.

Referring now to FIGS. 4 and 7, in one or more arrangements, the stability evaluation module 213 may be configured to, if a measured value of at least one stability evaluation parameter satisfies an associated predetermined evaluation parameter condition, determine an accumulation value of the at least one stability evaluation parameter. The stability evaluation module 213 may be configured to, if the accumulation value satisfies a first predetermined accumulation condition, set the accumulation value equal to a first limit value. The stability evaluation module 213 may be configured to, if the accumulation value satisfies a second predetermined accumulation condition after being set to the first limit value, control operation of the vehicle to generate a stability alert.

In one or more arrangements, the stability evaluation module 213 may be configured to, if the accumulation value of a stability parameter does not satisfy the first predetermined accumulation condition, determine if the accumulation value satisfies a third predetermined accumulation condition. The stability evaluation module 213 may be configured to, if the accumulation value satisfies the third predetermined accumulation condition, set the accumulation value equal to a second limit value different from the first limit value. The stability evaluation module 213 may be configured to, the stability evaluation module 213 may be configured to, if the accumulation value satisfies the second predetermined condition after being set to the second limit value, control operation of the vehicle to generate a stability alert.

For example, in one or more arrangements, the stability evaluation module 213 may be configured to evaluate the measured yaw rate om with respect to a fourth, predetermined yaw rate threshold T4Y to determine if an instability condition exists in the vehicle-trailer system. Simultaneously with using the measured yaw rate OM and the expected yaw rate $\omega_E$ to evaluate the condition in block 410, the stability evaluation module 213 may determine (in block 710) if a predetermined yaw rate condition is currently met wherein an absolute value of a difference between the measured yaw rate $\omega_M$ and the expected yaw rate $\omega_E$ exceeds an associated predetermined threshold value T4Y (i.e., "$|(\omega_M-\omega_E)|>T4Y$"). For purposes of evaluation using this condition, it is the magnitude of the difference, not the sign (+ or −) of the difference that is considered to be significant. For purposes of determining if the second predetermined yaw rate condition is currently met, a most recently measured yaw rate OM may be stored in memory for use in the computation (block 703).

The value of the yaw rate flag YRF2 may be set based on the value of a yaw rate tracking parameter $(\omega_M-\omega_E)_{ACC}$ (designated the "delta yaw accumulation"). The delta yaw accumulation value may reflect accumulated changes to the yaw rate during the most recent time period tM over which the yaw rate flag status YRF2 is to be evaluated for purposes of determining whether or not an instability condition exists.

The delta yaw accumulation $(\omega_M-\omega_E)_{ACC}$ may be initialized using data acquired during the most recent time period tM over which the yaw rate flag status YRF is to be evaluated for purposes of determining whether or not an_instability condition exists. The value of $(\omega_M-\omega_E)$ ACC may be reset to "0" after the vehicle engine is shut off at the end of a trip of the vehicle. For purposes of the evaluation in blocks 711 and 712, the stability evaluation module 213 may be configured to calculate the initial value of $(\omega_M-\omega_E)_{ACC}$ using data from vehicle dynamics data 207, sensor data 119, and/or from other source(s). The initial value of $(\omega_M - \omega_E)_{ACC}$ may be determined using the relationship:

$$(\omega_M - \omega_E)_{ACC} = (\omega_M - \omega_E)_{end} - (\omega_M - \omega_E)_{start} \qquad (7)$$

where:

$(\omega_M - \omega_E)_{end}$=the difference between the measured yaw rate $\omega_M$ and the expected yaw rate $\omega_E$ at the end of the most recent time period tM $(\omega_M - \omega_E)_{start}$=the difference between the measured yaw rate $\omega_M$ and the expected yaw rate $\omega_E$ at the start of the most recent time period tM As new values of $\omega_M$ and $\omega_E$ are determined, the quantity $|(\omega_M - \omega_E)|$ is re-evaluated in block 710 to determine if it exceeds the predetermined yaw rate threshold T4Y. In one or more arrangements, in cases where the quantity $|(\omega_M - \omega_E)|$ exceeds the predetermined yaw rate threshold T4Y, the delta yaw accumulation may be updated in block 712 using the following relationship:

$$(\omega_M - \omega_E)_{ACC} = (\omega_M - \omega_E)_{ACC} + \omega_{YIR} * |(\omega_M - \omega_E)|$$

where:

$|(\omega_M - \omega_E)|$=an absolute value of the difference between the latest or current measured yaw rate $\omega_M$ and the latest or current expected yaw rate $\omega_E$; and $\omega_{VIR}$=a yaw volatility increase rate, which is a fixed calibration parameter based on vehicle testing prior to use of the vehicle in the towing application.

The yaw volatility increase rate $\omega_{VIR}$ may reflect a sensitivity of the stability monitoring system to increases in the yaw rate.

In some aspects, a stability evaluation module of the stability monitoring system may use value(s) of one or more fixed-value calibration parameters $\omega_{VIR}$, $\omega_{VDR}$, $a_{VDR}$, and $a_{VIR}$ in determining conditions of stability and instability in a vehicle-trailer system. Calibration parameters are extensively used in automotive design in order to adjust or "tune" operation of a particular control module to the vehicle design in which the module is to be used. Methods for determining calibration parameters usable in vehicle control systems are well-known. For example, the development and use of calibration parameters in engine control modules configured to implement associated control algorithms are well-known.

In some examples, initially, a control module configured to implement an associated control algorithm must be functioning with estimated parameters. These estimated parameters may be derived from simulation of the control system function or from prior experience with similarly-purposed control systems, for example.

A next step in determining calibration parameter(s) may be to validate performance of the module using data sampled from the actual vehicle design into which the module is to be incorporated. The sampled data may be input into the module to test module function and help eliminate software or design errors.

A next step in determining calibration parameter(s) may entail actual testing of vehicle design and operation of the stability evaluation module across an anticipated range of operating conditions of the vehicle. In the case of a stability evaluation module configured to implement a trailer stability monitoring algorithm as described herein, this testing may involve defining vehicle driving scenarios with a variety of trailers. Some of the driving scenarios may be designed to produce stable driving conditions of various degrees, while other driving scenarios may be designed to produce unstable driving conditions of various degrees. For example, various trailer designs may be tested in unloaded conditions and also in loaded conditions designed to produce stable and unstable driving conditions during towing.

Values of vehicle and trailer dynamics parameters associated with a specified transition from stable (or "comfortable") driving conditions to unstable (or "uncomfortable") or unsafe condition should be understood in order to define the transition characteristics for use by the stability evaluation module. The calibration parameters can then be further adjusted in real time to for use by the stability evaluation module in determining when stability and instability conditions are present in the vehicle-trailer system. Typically, the vehicle test data (e.g., information from logs of vehicle dynamics parameters like yaw, lateral acceleration, etc.) may be captured during the actual vehicle testing and used in further simulations to fine tune the calibration parameters.

In a manner just described, the calibration parameters may be tuned to optimum values for ensuring reliable operation of the stability evaluation module, the purpose of the parameters being to reliably provide warnings of unsafe conditions during towing of a trailer, while eliminating or minimizing false detection of instability conditions.

The steps used in determining values of the calibration parameters may be performed in a different order than just described. In addition, some steps may be omitted and/or other steps may be added. Values of the calibration parameters $\omega_{VIR}$, $\omega_{VDR}$, $a_{VDR}$, and $a_{VIR}$ described herein may be determined in a manner similar to that just described, in another known manner, or in a manner yet to be developed. Determination of the calibration parameter values will typically be performed for every vehicle design that differs significantly from previous vehicle designs.

Testing using embodiments of the stability evaluation module described herein has indicated that the stability/instability determinations provided by the module are relatively insensitive to variations in the unloaded trailer parameters, and depend primarily on towing vehicle parameters and parameters of the trailer in a loaded condition. Unbalanced or overloaded trailers may then produce instability conditions that are detected by the stability evaluation module, prompting generation of alerts and other responses (such as deactivation of a lane tracing assist (LTA) system, for example).

Referring again to FIG. 7, In cases where the quantity $|(\omega_M - \omega_E)|$ does not exceed the predetermined yaw rate threshold T4Y, the delta yaw accumulation may be determined and updated (in block 711) using the following relationship:

$$(\omega_M - \omega_E)_{ACC} = |(\omega_M - \omega_E)| - \omega_{VDR}$$

where $\omega_{VDR}$=a yaw volatility decrease rate, which is a fixed calibration parameter based on vehicle testing prior to use of the vehicle in the towing application. The yaw volatility decrease rate $\omega_{VDR}$ may be determined in a manner previously described and may define a sensitivity of the stability monitoring system to decreases in the yaw rate.

Following the determination of a current (latest) delta yaw accumulation value $(\omega_M - \omega_E)_{ACC}$ in block 711 or block 712, the stability evaluation module 213 may (in block 714)

determine if the latest value of $(\omega_M - \omega_E)_{ACC}$ exceeds a first predetermined yaw accumulation value FYAV. The delta yaw accumulation may rise or fall during driving of the vehicle, depending on the dynamic conditions. A net increase in the value of the delta yaw accumulation over multiple successive time periods tM may indicate a growing instability condition in the vehicle-trailer system. In one or more particular arrangements, the first predetermined yaw accumulation value FYAV may be 10,000. In one or more arrangements, the lateral acceleration accumulation value may be expressed in terms of any suitable conventional unit of yaw rate (e.g., degrees/second or radians/second).

If the latest value of $(\omega_M - \omega_E)_{ACC}$ exceeds the first predetermined yaw accumulation value FYAV, the stability evaluation module 213 may (in block 716) set the value of $(\omega_M - \omega_E)_{ACC}$ to the first predetermined yaw accumulation value FYAV. This puts an upper limit on the value of $(\omega_M - \omega_E)_{ACC}$ for evaluation purposes. Control may then pass to block 721 to determine if a second predetermined accumulation condition $(\omega_M - \omega_E)_{ACC} > T9Y$ is currently met.

Returning to block 714, If the latest value of $(\omega_M - \omega_E)_{ACC}$ does not exceed the first predetermined yaw accumulation value, the stability evaluation module 213 may (in block 717) determine if the latest value of $(\omega_M - \omega_E)_{ACC}$ is below another predetermined yaw accumulation value SYAV. In one or more particular arrangements, the second predetermined yaw accumulation value SYAV may be 0 (zero). If the latest value of $(\omega_M - \omega_E)_{ACC}$ is below the second predetermined yaw accumulation value SYAV, the stability evaluation module 213 may (in block 720) set the value of $(\omega_M - \omega_E)_{ACC}$ to the second predetermined yaw accumulation value SYAV. This puts a lower limit on the value of $(\omega_M - \omega_E)_{ACC}$ for evaluation purposes. Control may then pass to block 721 to determine if the second predetermined accumulation condition $(\omega_M - \omega_E)_{ACC} > T9Y$ is currently met. If the latest value of $(\omega_M - \omega_E)_{ACC}$ is not below the second predetermined yaw accumulation value, control may pass to block 721 to determine if a second predetermined yaw rate accumulation condition $(\omega_M - \omega_E)_{ACC} > T9Y$ is currently met.

For example, as described herein, the yaw rate flag YRF2 may be assigned a status value indicating whether or not the second predetermined yaw rate accumulation condition in block 721 is currently met. Specifically, the YRF2 value may be set to "0" if the predetermined yaw rate condition in block 721 is not currently met, and to "1" if the second predetermined yaw rate condition is currently met. If the predetermined yaw rate condition in block 721 is determined to be met, the stability evaluation module 213 may (in block 722) determine if the value of the yaw rate flag YRF2 is set to "0". If the flag value is set to "0", the stability evaluation module 213 may (in block 723) set the YRF2 value to "1" (since the predetermined yaw rate condition in block 721 is met).

After it has been determined that a stability alert is advisable and the YRF2 value has been set to "1", the stability evaluation module 213 may (in block 730), determine if a stability alert is currently activated. The stability evaluation module 213 may be configured to (in block 732, if a stability alert is not currently activated) activate a stability alert. The stability evaluation module 213 may also be configured to (simultaneously with execution of block 732) deactivate a lane tracing assist system of the vehicle (in block 734).

Returning to block 721, if the predetermined yaw rate condition in block 721 is not met, the stability evaluation module 213 may (in block 724) determine if the value of the yaw rate flag YRF2 is set to "1". If the flag value is set to "1", the stability evaluation module 213 may (in block 725)

set the YRF2 value to "0" (since the second predetermined yaw rate condition in block 721 is not met).

After it has been determined that a stability alert is not needed and the YRF2 value has been set to "0", control may pass to block 736, where the stability evaluation module 213 may determine if a stability alert is currently activated. The stability evaluation module 213 may be configured to (in block 740, if a stability alert is currently activated but is not needed) deactivate the stability alert. The stability evaluation module 213 may also be configured to (in block 738, simultaneously with execution of block 740) activate the lane tracing assist system of the vehicle.

As described herein, blocks 406, 408, and 710-740 (as required) may be performed at regular evaluation time intervals of xE to update the status of the yaw rate flag YRF2. In the embodiment illustrated in FIG. 7, the evaluations performed by the time averaging steps in other embodiments (for example, in blocks 426-440 in FIG. 4) are instead effectively performed by the operations described in blocks 711-721. Thus, in this embodiment, the stability evaluation module 213 may evaluate the status of the flag to determine if a stability alert is required.

Figure 8:
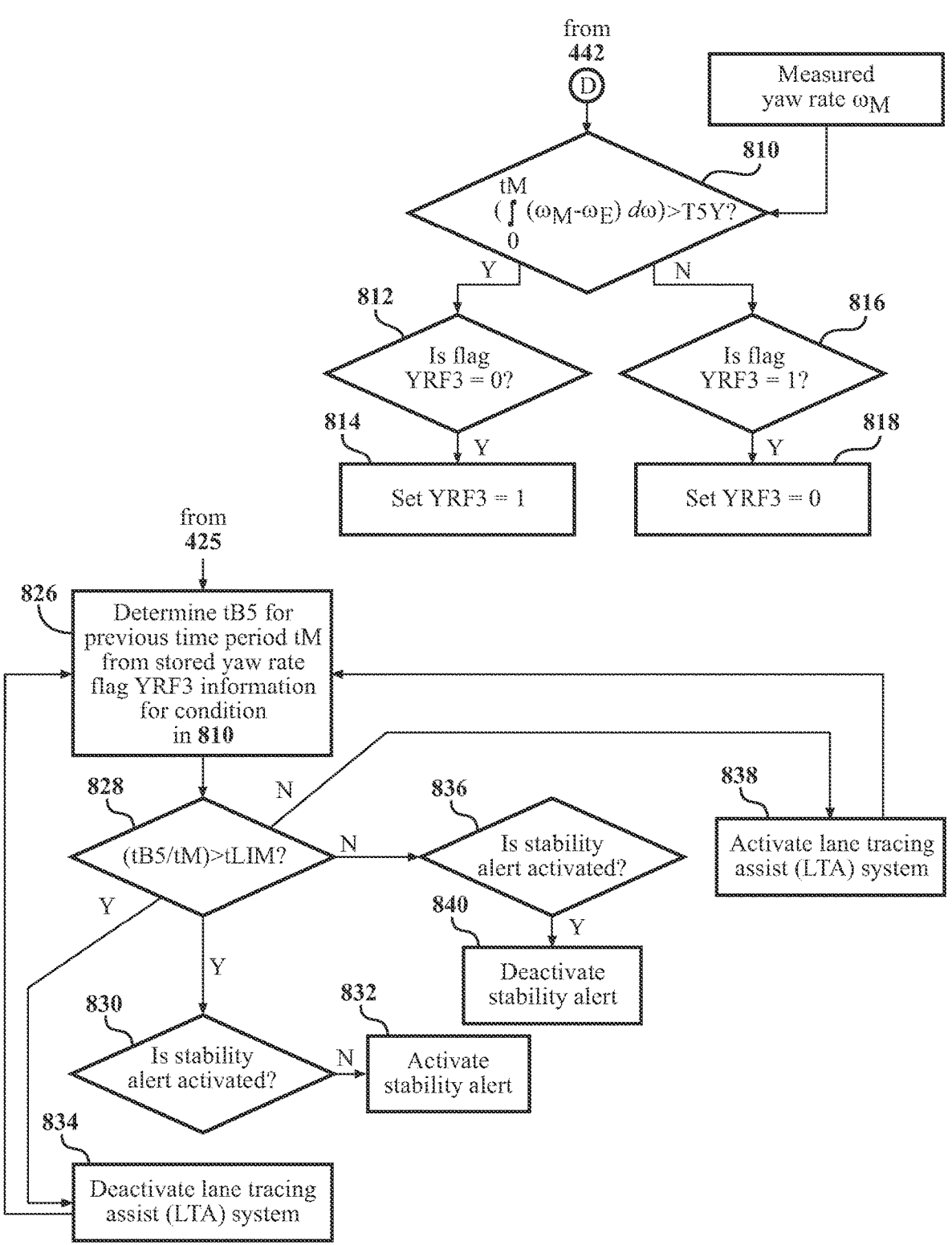
FIG. 8 is a flow diagram illustrating operation of yet another aspect of the vehicle-trailer stability monitoring system, also based on use of a measured vehicle yaw rate as a vehicle-trailer stability criterion.

Referring now to FIGS. 4 and 8, in one or more arrangements, the stability evaluation module 213 may be configured to evaluate the measured yaw rate $\omega_M$ with respect to a fifth, predetermined yaw rate threshold T5Y to determine if an instability condition exists in the vehicle-trailer system. To this end, simultaneously with using the measured yaw rate $\omega_M$ and the expected yaw rate $\omega_E$ to evaluate the condition in block 410, the stability evaluation module 213 may determine (in block 810) if a fifth, predetermined yaw rate condition is currently met (in this case, a condition wherein an integral of the difference between the measured yaw rate OM and the expected yaw rate OF taken over the most recent previous predetermined time period tM exceeds the associated predetermined threshold value T5Y):

$$\left( \int_0^{tM} (\omega_M - \omega_E) d\omega \right) > T5Y \tag{7}$$

For purposes of determining if the fifth, predetermined yaw rate condition is currently met, a most recently measured yaw rate $\omega_M$ may be stored in memory for use in the computation.

A yaw rate flag YRF3 may have a status value indicating whether or not the predetermined yaw rate condition in block 810 is currently met. The YRF3 value may be set to "0" if the third predetermined yaw rate condition is not currently met, and to "1" if the predetermined yaw rate condition is currently met. If the predetermined yaw rate condition is determined to be met in block 810, the stability evaluation module 213 may (in block 812) determine if the value of the yaw rate flag YRF3 is set to "0". If the flag value is set to "0", the stability evaluation module 213 may (in block 814) set the YRF3 value to "1" (since the predetermined yaw rate condition in block 810 is met).

Returning to block 810, if the predetermined yaw rate condition is not met, the stability evaluation module 213 may (in block 816) determine if the value of the yaw rate flag YRF3 is set to "1". If the flag value is set to "1", the stability evaluation module 213 may (in block 818) set the YRF3 value to "0" (since the predetermined yaw rate condition in block 810 is not met).

In the manner previously described, blocks 406 and 810-818 may be performed at regular evaluation time intervals of xE to update the status of the yaw rate flag YRF3 as needed. The time-dependent values of YRF3 may be stored in a memory, along with a time value associated with each YRF3 value. Using this information, the time period(s) during which the third predetermined yaw rate condition is met and the total time during which the third predetermined yaw rate condition is met can be determined for evaluation purposes. In this manner, data regarding the status of the flag YRF3 may be stored for evaluation, to determine if a stability alert should be generated (or an existing stability alert discontinued).

In addition, as previously described with respect to yaw rate flag YRF values in blocks 408-418, yaw rate flag YRF3 values are being collected over a time period of at least tM in blocks 442 and 510-518 while the elapsed time tC is incrementing to a value of at least tM in blocks 420-425. This ensures that a sufficient amount of yaw rate flag YRF3 information is available for evaluation for purposes of determining if a stability alert is required. For example, when the timer has run to where tL=540 milliseconds and tM=500 milliseconds, then more than 500 milliseconds of YRF3 information will have been compiled by execution of blocks 442-618.

When (in block 425) tL>tM, control may transfer to block 826, where the stability evaluation module 213 may be configured to determine the total time tB5 and determine the quotient tB5/tM. The stability evaluation module 213 may determine (from the stored yaw rate flag YRF3 information) a total time tB5, during the last tM, that the yaw rate flag YRF3 was equal to "1". Thus, for example, where tM=500 milliseconds, the yaw rate flag YRF3 may have been equal to "1" for a total of 300 milliseconds over the last 500 milliseconds of elapsed time. In this case, the quotient tB5/tM=300/500=0.6.

The stability evaluation module 213 may be configured to (in block 828) determine if the quotient tB5/tM satisfies the relationship (tB5/tM)>tLIM, in a manner similar to that previously described with respect to block 428. For example, if the yaw rate flag status YRF3 was "1" for a total of 300 milliseconds (i.e., if tB3=300 milliseconds) out of the last 500 milliseconds (where tM=500 milliseconds) and tLIM=0.5, then 300/500=0.6. Since 0.6>0.50, the relationship (tB5/tM)>tLIM is satisfied and a stability alert may be deemed advisable.

If it is determined in block 828 that tB5/tM>tLIM and that a stability alert is advisable, the stability evaluation module 213 may be configured to (in block 830) determine if a stability alert is currently activated. The stability evaluation module 213 may be configured to (in block 832, if a stability alert is not currently activated) activate a stability alert. The stability evaluation module 213 may also be configured to (simultaneously with execution of block 832) deactivate a lane tracing assist system of the vehicle (in block 834).

Returning to block 828, if it is determined in block 828 that tB5/tM is not >tLIM and that a stability alert is not needed, control may pass to block 836, where the stability evaluation module 213 may be configured to determine if a stability alert is currently activated. The stability evaluation module 213 may be configured to (in block 840, if a stability alert is currently activated but is not needed) deactivate the stability alert. The stability evaluation module 213 may also be configured to (in block 838, simultaneously with execution of block 840) activate the lane tracing assist system of the vehicle.

Thus, as just described, once block 826 begins to execute (i.e., after tL>tM), the steps in blocks 826-834 will repeat every time period xE, and the proportion of time during the most recent predetermined time period tM that the yaw rate flag YRF3 was "1" will be determined, to update the alert status on an "as needed" basis.

The stability monitoring system may be configured to operate as just described to simultaneously evaluate conditions relating to yaw rate, lateral acceleration and/or other parameters, so that if a trigger condition relating to any one (or more than one) parameter is met, a stability alert may be activated. Similarly, if none of the trigger conditions applicable to any of the parameters is met, the stability alert may be deactivated or left unactivated.

Although several possible criteria for evaluating dynamic stability in terms of lateral acceleration and yaw rate are discussed herein, alternative criteria may also be used.

Figure 9:
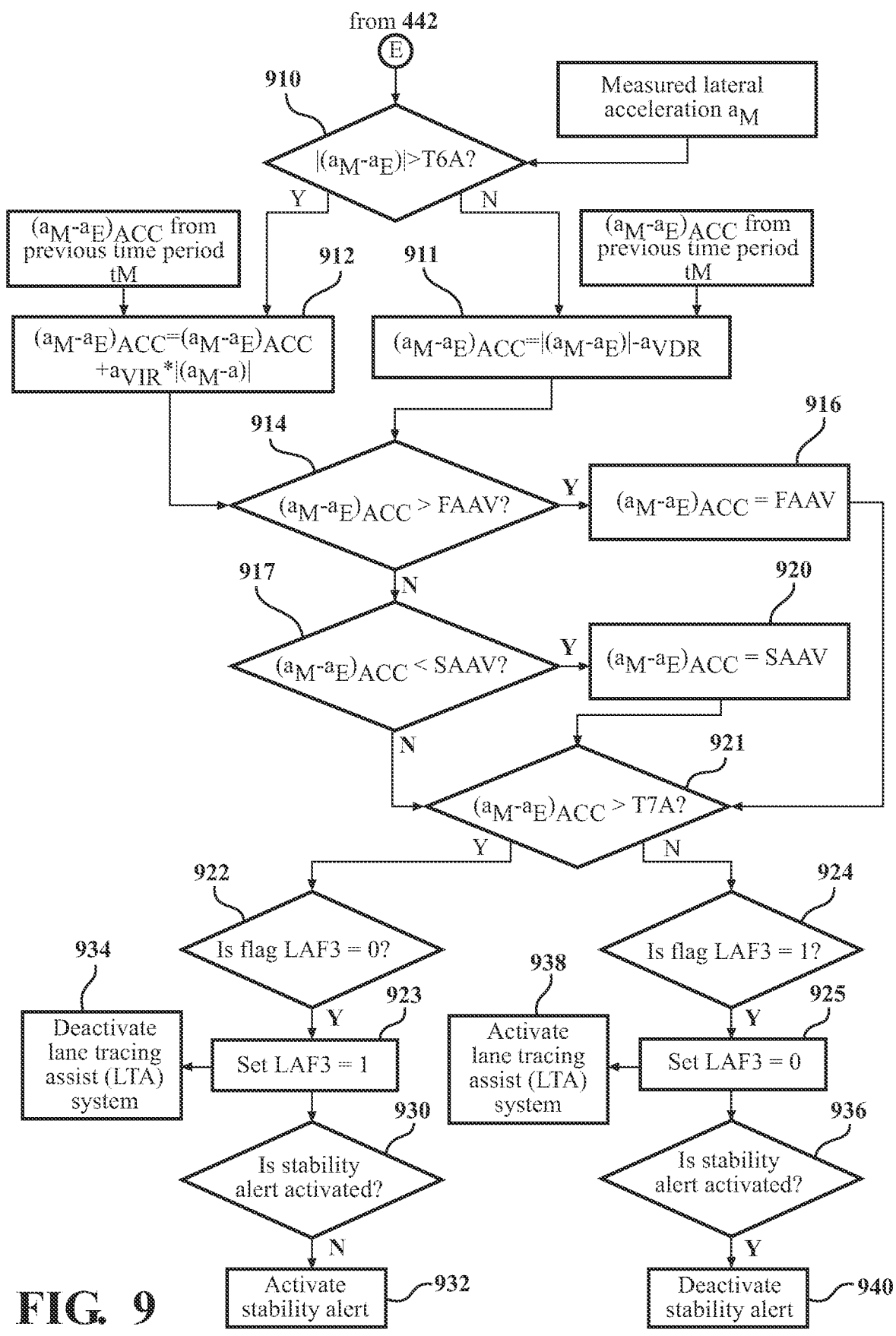
FIG. 9 is a flow diagram illustrating operation of yet another aspect of the vehicle-trailer stability monitoring system, also based on use of the measured vehicle lateral acceleration as a vehicle-trailer stability criterion.

Referring now to FIGS. 4 and 9, in one or more arrangements, the stability evaluation module 213 may be configured to evaluate the measured lateral acceleration rate $a_M$ with respect to a sixth, predetermined lateral acceleration threshold T6A to determine if an instability condition exists in the vehicle-trailer system. To this end, simultaneously with using the measured lateral acceleration ay and the expected lateral acceleration $a_E$ to evaluate the condition in blocks 510 and 610, the stability evaluation module 213 may determine (in block 910) if a predetermined lateral acceleration condition is currently met wherein an absolute value of a difference between the measured lateral acceleration $a_M$ and the expected lateral acceleration $a_E$ exceeds an associated predetermined threshold value T6A (i.e., "l($a_M$–$a_E$) l>T6A"). For purposes of evaluation using this condition, it is the magnitude of the difference, not the sign (+ or −) of the difference that is considered to be significant. For purposes of determining if the second predetermined lateral acceleration condition is currently met, a most recently measured lateral acceleration $a_M$ may be stored in memory for use in the computation.

The value of a lateral acceleration flag LAF3 may be set based on the value of a lateral acceleration tracking parameter $(a_M$–$a_E)_{ACC}$ (designated the "delta lateral acceleration accumulation"). The value of the delta lateral acceleration accumulation may reflect accumulated changes to the lateral acceleration during the most recent time period tM over which the status of the lateral acceleration rate flag LAF3 is to be evaluated for purposes of determining whether or not an instability condition exists.

The delta lateral acceleration accumulation $(a_M$–$a_E)_{ACC}$ may be initialized using data acquired during the most recent time period tM over which the status of the lateral acceleration flag LAF3 is to be evaluated for purposes of determining whether or not an_instability condition exists. The value of $(a_M$–$a_E)_{ACC}$ may be reset to "0" after the vehicle engine is shut off at the end of a trip of the vehicle. For purposes of the evaluation in blocks 911 and 912, the stability evaluation module 213 may be configured to calculate the initial value of $(a_M$–$a_E)_{ACC}$ using data from vehicle dynamics data 207, sensor data 119, and/or from other source(s). The initial value of $(a_M$–$a_E)_{ACC}$ may be determined using the relationship:

$$(a_M - a_E)_{end} - (a_M - a_E)_{start}$$

where $(a_M$–$a_E)_{end}$=the difference between the measured lateral acceleration $a_M$ and the expected lateral acceleration $a_E$ at the end of the most recent time period tM $(a_M\text{-}a_E)_{start}$=the difference between the measured lateral acceleration $a_M$ and the expected lateral acceleration $a_E$ at the start of the most recent time period tM As new values of $a_M$ and ag are determined, the quantity $|(a_M\text{-}a_E)|$ is re-evaluated in block 910 to determine if it exceeds the predetermined lateral acceleration threshold T6A. In one or more arrangements, in cases where the quantity $|(a_M\text{-}a_E)|$ exceeds the predetermined lateral acceleration threshold T6A, the delta lateral acceleration accumulation may be updated in block 912 using the following relationship:

$$(a_M - a_E)_{ACC} = (a_M - a_E)_{ACC} + a_{VIR} * |(a_M - a_E)|$$

where:

$|(a_M\text{-}a_E)|$=an absolute value of the difference between the latest or current measured lateral acceleration $a_M$ and the latest or current expected lateral acceleration $a_E$; and $a_{VIR}$=a lateral acceleration volatility increase rate, which is a fixed calibration parameter based on vehicle testing prior to use of the vehicle in the towing application.

The lateral acceleration volatility increase rate $a_{VIR}$ may be determined in a manner previously described and may reflect a sensitivity of the stability monitoring system to increases in the lateral acceleration.

In cases where the quantity $|(a_M\text{-}a_E)|$ does not exceed the predetermined lateral acceleration threshold T6A, the lateral acceleration accumulation may be determined and updated (in block 911) using the following relationship:

$$(a_M - a_E)_{ACC} = |(a_M - a_E)| - a_{VDR}$$

where $a_{VDR}$=a lateral acceleration volatility decrease rate, which is a fixed calibration parameter based on vehicle testing prior to use of the vehicle in the towing application. The lateral acceleration volatility decrease rate $a_{VDR}$ may be determined in a manner previously described and may reflect a sensitivity of the stability monitoring system to decreases in the lateral acceleration.

Following the determination of a current (latest) value of $(a_M\text{-}a_E)_{ACC}$ in block 911 or block 912, the stability evaluation module 213 may (in block 914) determine if the latest value of $(a_M\text{-}a_E)_{ACC}$ exceeds a first predetermined lateral acceleration accumulation value FAAV. The lateral acceleration accumulation may rise or fall during driving of the vehicle, depending on the dynamic conditions. A net increase in the value of the delta lateral acceleration accumulation over multiple successive time periods tM may indicate a growing instability condition in the vehicle-trailer system. In one or more particular arrangements, the first predetermined lateral acceleration accumulation value FAAV may be 10,000. In one or more arrangements, the lateral acceleration accumulation value FAAV may be expressed in terms of any suitable conventional unit of lateral acceleration (e.g., meters/second$^2$).

If (in block 914) the latest value of $(a_M\text{-}a_E)_{ACC}$ exceeds the first predetermined lateral acceleration accumulation value, the stability evaluation module 213 may (in block 916) set the value of $(a_M\text{-}a_E)_{ACC}$ to the first predetermined lateral acceleration accumulation value. This puts an upper limit on the value of $(a_M\text{-}a_E)_{ACC}$ for evaluation purposes.

Control may then pass to block 921 to determine if the predetermined lateral acceleration condition $(a_M\text{-}a_E)_{ACC}$>T7A is currently met.

Returning to block 914, If the latest value of $(a_M\text{-}a_E)_{ACC}$ does not exceed the first predetermined lateral acceleration accumulation value, the stability evaluation module 213 may (in block 917) determine if the latest value of $(a_M\text{-}a_E)_{ACC}$ is below a second predetermined lateral acceleration accumulation value. In one or more particular arrangements, the second predetermined lateral acceleration accumulation value may be 0 (zero). If the latest value of $(a_M\text{-}a_E)_{ACC}$ is below the second predetermined lateral acceleration accumulation value, the stability evaluation module 213 may (in block 920) set the value of $(a_M\text{-}a_E)_{ACC}$ to the second predetermined value. This puts lower limit on the value of $(a_M\text{-}a_E)_{ACC}$ for evaluation purposes. Control may then pass to block 921 to determine if the predetermined lateral acceleration condition $(a_M\text{-}a_E)_{ACC}$>T7A is currently met. If the latest value of $(a_M\text{-}a_E)_{ACC}$ is not below the second predetermined lateral acceleration accumulation value, control may pass to block 921, to determine if the predetermined lateral acceleration condition $(a_M\text{-}a_E)_{ACC}$>T7A is currently met.

As described herein, the lateral acceleration flag LAF3 may be assigned a status value indicating whether or not the predetermined lateral acceleration condition in block 921 is currently met. Specifically, the LAF3 value may be set to "0" if the predetermined lateral acceleration condition in block 921 is not currently met, and to "1" if the second predetermined lateral acceleration condition is currently met. If the predetermined lateral acceleration condition in block 921 is determined to be met, the stability evaluation module 213 may (in block 922) determine if the value of the lateral acceleration flag LAF3 is set to "0". If the flag value is set to "0", the stability evaluation module 213 may (in block 923) set the LAF3 value to "1" (since the predetermined lateral acceleration condition in block 921 is met).

After it has been determined that a stability alert is advisable and the LAF3 value has been set to "1", the stability evaluation module 213 may (in block 930), determine if a stability alert is currently activated. The stability evaluation module 213 may be configured to (in block 932, if a stability alert is not currently activated) activate a stability alert. The stability evaluation module 213 may also be configured to (simultaneously with execution of block 932) deactivate a lane tracing assist system of the vehicle (in block 934).

Returning to block 921, if the predetermined lateral acceleration condition is not met, the stability evaluation module 213 may (in block 924) determine if the value of the lateral acceleration flag LAF3 is set to "1". If the flag value is set to "1", the stability evaluation module 213 may (in block 925) set the LAF3 value to "0" (since the second predetermined lateral acceleration condition in block 921 is not met).

After it has been determined that a stability alert is not needed and the LAF3 value has been set to "0", control may pass to block 936, where the stability evaluation module 213 may determine if a stability alert is currently activated. The stability evaluation module 213 may be configured to (in block 940, if a stability alert is currently activated but is not needed) deactivate the stability alert. The stability evaluation module 213 may also be configured to (in block 938, simultaneously with execution of block 940) activate the lane tracing assist system of the vehicle.

As described herein, blocks 406, 408, and 910-940 (as required) may be performed at regular evaluation time intervals of xE to update the status of the yaw rate flag LAF3. In the embodiment illustrated in FIG. 9, the evaluations performed by the time averaging steps in other embodiments (for example, in blocks 426-440 in FIG. 4) are instead effectively performed by the operations described in blocks 711-721. Thus, in this embodiment, the stability evaluation module 213 may evaluate the status of the flag to determine if a stability alert is required.

Figure 10:
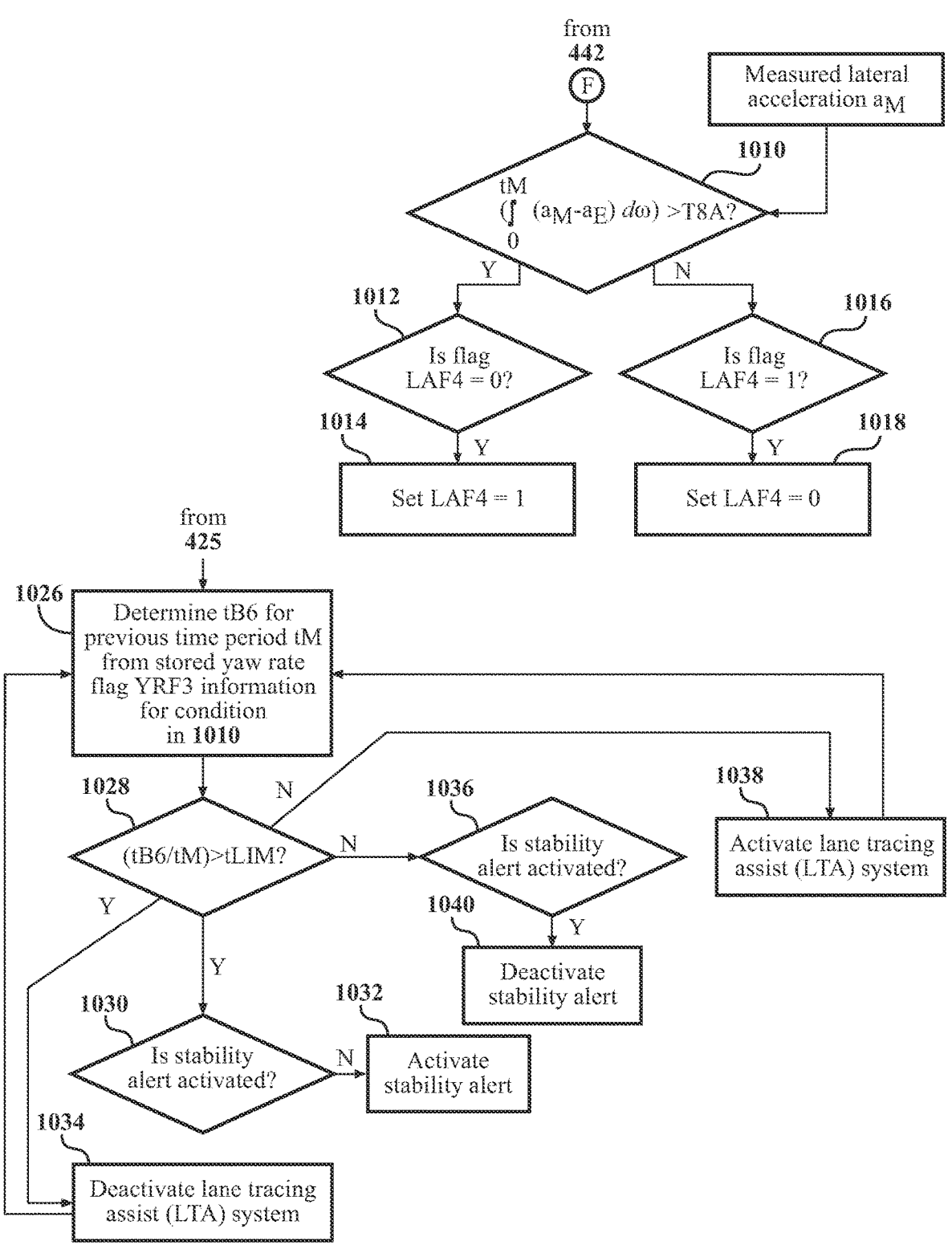
FIG. 10 is a flow diagram illustrating operation of yet another aspect of the vehicle-trailer stability monitoring system, also based on use of the measured vehicle lateral acceleration as a vehicle-trailer stability criterion.

Referring now to FIGS. 4 and 10, in one or more arrangements, the stability evaluation module 213 may be configured to evaluate the measured lateral acceleration $a_M$ with respect to another predetermined yaw rate threshold T8A to determine if an instability condition exists in the vehicle-trailer system. To this end, simultaneously with using the measured lateral acceleration $a_M$ and the expected lateral acceleration $a_E$ to evaluate the condition in block 1010, the stability evaluation module 213 may determine (in block 1010) if the predetermined lateral acceleration condition is currently met (in this case, a condition wherein an integral of the difference between the measured lateral acceleration $a_M$ and the expected lateral acceleration $a_E$ taken over the most recent previous predetermined time period tM exceeds an associated predetermined threshold value T8A):

$$\left( \int_0^{tM} (a_M - a_E) d\omega \right) > T8A \qquad (7)$$

For purposes of determining if the predetermined lateral acceleration condition in block 1010 is currently met, a most recently measured lateral acceleration $a_M$ may be stored in memory for use in the computation.

A lateral acceleration flag LAF4 may have a status value indicating whether or not the predetermined lateral acceleration condition is currently met. The LAF4 value may be set to "0" if the predetermined lateral acceleration condition is not currently met, and to "1" if the predetermined lateral acceleration condition is currently met. If the predetermined lateral acceleration condition is determined to be met in block 1010, the stability evaluation module 213 may (in block 1012) determine if the value of the lateral acceleration flag LAF4 is set to "0". If the flag value is set to "0", the stability evaluation module 213 may (in block 814) set the LAF4 value to "1" (since the third predetermined lateral acceleration condition in block 1010 is met).

Returning to block 1010, if the third predetermined yaw rate condition is not met, the stability evaluation module 213 may (in block 1016) determine if the value of the lateral acceleration flag LAF3 is set to "1". If the flag value is set to "1", the stability evaluation module 213 may (in block 818) set the LAF4 value to "0" (since the predetermined lateral acceleration condition is not met).

In the manner previously described, blocks 406 and 1010-1018 may be performed at regular evaluation time intervals of xE to update the status of the lateral acceleration flag LAF4 as needed. The time-dependent values of LAF4 may be stored in a memory, along with a time value associated with each LAF4 value. Using this information, the time period(s) during which the predetermined lateral acceleration condition is met and the total time during which the predetermined lateral acceleration condition is met can be determined for evaluation purposes. In this manner, data regarding the status of the flag LAF4 may be stored for evaluation, to determine if a stability alert should be generated (or an existing stability alert discontinued).

In addition, as previously described with respect to lateral acceleration flag LAF1 values in blocks 510-518 of FIG. 5, lateral acceleration flag LAF4 values are being collected over a time period of at least tM in blocks 442 and 1010-1018 while the elapsed time tC is incrementing to a value of at least tM in blocks 420-425 (FIG. 4). This ensures that a sufficient amount of lateral acceleration flag LAF4 information is available for evaluation for purposes of determining if a stability alert is required. For example, when the timer has run to where tL=540 milliseconds and tM=500 milliseconds, then more than 500 milliseconds of YRF3 information will have been compiled by execution of blocks 442-618.

When (in block 425) tL>tM, control may transfer to block 1026, where the stability evaluation module 213 may be configured to determine the total time tb6 and determine the quotient tB6/tM. The stability evaluation module 213 may determine (from the stored lateral acceleration flag LAF4 information) a total time tb6, during the last tM, that the lateral acceleration flag LAF4 was equal to "1". Thus, for example, where tM=500 milliseconds, the lateral acceleration flag LAF4 may have been equal to "1" for a total of 300 milliseconds over the last 500 milliseconds of elapsed time. In this case, the quotient tB1/tM=300/500=0.6.

The stability evaluation module 213 may be configured to (in block 1028) determine if the quotient tb6/tM satisfies the relationship (tB6/tM)>tLIM, in a manner similar to that previously described with respect to block 428. For example, if the lateral acceleration flag status LAF4 was "1" for a total of 300 milliseconds (i.e., if tB3=300 milliseconds) out of the last 500 milliseconds (where tM=500 milliseconds) and tLIM=0.5, then 300/500=0.6. Since 0.6>0.50, the relationship (tB5/tM)>tLIM is satisfied and a stability alert may be deemed advisable.

If it is determined in block 1028 that tb6/tM>tLIM and that a stability alert is advisable, the stability evaluation module 213 may be configured to (in block 1030) determine if a stability alert is currently activated. The stability evaluation module 213 may be configured to (in block 1032, if a stability alert is not currently activated) activate a stability alert. The stability evaluation module 213 may also be configured to (simultaneously with execution of block 1032) deactivate a lane tracing assist system of the vehicle (in block 1034).

Returning to block 1028, if it is determined in block 1028 that tB6/tM is not >tLIM and that a stability alert is not needed, control may pass to block 1036, where the stability evaluation module 213 may be configured to determine if a stability alert is currently activated. The stability evaluation module 213 may be configured to (in block 1040, if a stability alert is currently activated but is not needed) deactivate the stability alert. The stability evaluation module 213 may also be configured to (in block 1038, simultaneously with execution of block 1040) activate the lane tracing assist system of the vehicle.

Thus, as just described, once block 1026 begins to execute (i.e., after tL>tM), the steps in blocks 1026-1040 will repeat every time period xE, and the proportion of time during the most recent predetermined time period tM that the lateral acceleration flag LAF4 was "1" will be determined, to update the alert status on an "as needed" basis.

The stability monitoring system may be configured to operate as just described to simultaneously evaluate conditions relating to yaw rate, lateral acceleration and/or other parameters, so that if a trigger condition relating to any one (or more than one) parameter is met, a stability alert may be activated. Similarly, if none of the trigger conditions applicable to any of the parameters is met, the stability alert may be deactivated or left unactivated.

Although several possible criteria for evaluating dynamic stability in terms of lateral acceleration and yaw rate are discussed herein, alternative criteria may also be used.

Figure 11:
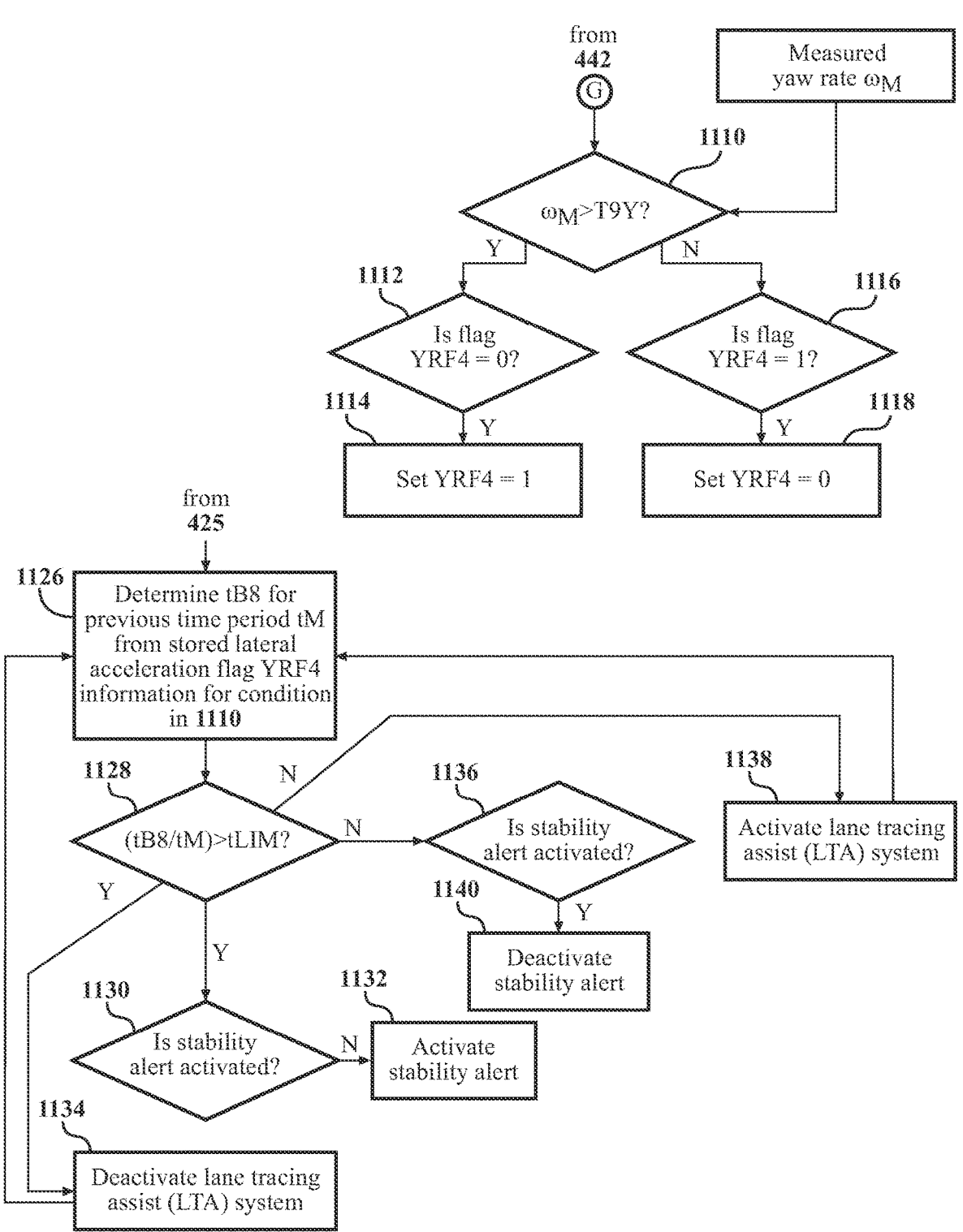
FIG. 11 is a flow diagram illustrating operation of yet another aspect of the vehicle-trailer stability monitoring system, also based on use of a measured vehicle yaw rate as a vehicle-trailer stability criterion.

Referring now to FIGS. 4 and 11, in one or more arrangements, the stability evaluation module 213 may be configured to evaluate the measured yaw rate om with respect to a ninth, predetermined yaw rate threshold T9Y to determine if an instability condition exists in the vehicle-trailer system. More specifically, the stability evaluation module 213 may be configured to determine (in block 1110) if a fourth predetermined yaw rate condition is currently met (in this case, a condition wherein the measured yaw rate om exceeds a predetermined threshold value T9Y (i.e., "$a_E$>T9Y")). For purposes of determining if the fourth predetermined yaw rate condition is currently met, a most recently measured yaw rate on may be stored in memory for use in the computation.

A yaw rate flag YRF4 may have a status value indicating whether or not the fourth predetermined yaw rate condition is currently met. The YRF4 value may be set to "0" if the fourth predetermined yaw rate condition is not currently met, and to "1" if the fourth predetermined yaw rate condition is currently met. If the fourth predetermined yaw rate condition is determined to be met in block 1110, the stability evaluation module 213 may (in block 1112) determine if the value of the yaw rate flag YRF4 is set to "0". If the flag value is set to "0", the stability evaluation module 213 may (in block 1114) set the LAF2 value to "1" (since the fourth predetermined yaw rate condition is met).

Returning to block 1110, if the fourth predetermined yaw rate condition is not met, the stability evaluation module 213 may (in block 1116) determine if the value of the yaw rate flag YRF4 is set to "1". If the flag value is set to "1", the stability evaluation module 213 may (in block 618) set the YRF4 value to "0" (since the fourth predetermined yaw rate condition is not met).

In the manner previously described, blocks 406, 442, and 1110-1118 may be performed at regular evaluation time intervals of xE to update the status of the lateral acceleration flag YRF4 as needed. The time-dependent values of YRF4 may be stored in a memory, along with a time value associated with each YRF4 value. Using this information, the time period(s) during which the fourth predetermined lateral acceleration condition is met and the total time during which the fourth predetermined lateral acceleration condition is met can be determined for evaluation purposes. In this manner, data regarding the status of the flag YRF4 may be stored for evaluation, to determine if a stability alert should be generated (or an existing stability alert discontinued).

In addition, as previously described with respect to yaw rate flag YRF4 values in blocks 412-418, lateral acceleration flag YRF4 values are being collected over a time period of at least tM in blocks 406, 442, and 1110-1118 while the elapsed time tC is incrementing to a value of at least tM in blocks 420-425. This ensures that a sufficient amount of yaw rate flag YRF4 information is available for evaluation for purposes of determining if a stability alert is required. For example, when the timer has run to where tL=540 milliseconds and tM=500 milliseconds, then more than 500 milliseconds of YRF4 information will have been compiled by execution of blocks 406, 442, and 1110-1118.

When (in block 425) tL>tM, control may transfer to block 1126, where the stability evaluation module 213 may be configured to determine the total time tB8 and determine the quotient tB8/tM. The stability evaluation module 213 may determine (from the stored lateral acceleration flag YRF4 information) a total time tB8, during the last tM, that the yaw rate flag status YRF4 was equal to "1". Thus, for example, where tM=500 milliseconds, the yaw rate flag status YRF4 may have been equal to "1" for a total of 300 milliseconds over the last 500 milliseconds of elapsed time. In this case, the quotient tB8/tM=300/500=0.6.

The stability evaluation module 213 may be configured to (in block 1128) determine if the quotient tB8/tM satisfies the relationship (tB8/tM)>tLIM, in a manner similar to that previously described with respect to block 428. For example, if the yaw rate flag status YRF4 was "1" for a total of 300 milliseconds (i.e., if tB8=300 milliseconds) out of the last 500 milliseconds (where tM=500 milliseconds) and tLIM=0.5, then 300/500=0.6. Since 0.6>0.50, the relationship (tB8/tM)>tLIM is satisfied and a stability alert may be deemed advisable.

If it is determined in block 1128 that tB8/tM>tLIM and that a stability alert is advisable, the stability evaluation module 213 may be configured to (in block 1130) determine if a stability alert is currently activated. The stability evaluation module 213 may be configured to (in block 1132, if a stability alert is not currently activated) activate a stability alert. The stability evaluation module 213 may also be configured to (simultaneously with execution of block 1130) deactivate a lane tracing assist system of the vehicle (in block 1134). Control may then return to block 1126, where the stability evaluation module 213 may then update the value of tb3, and then update the quotient tB8/tM (block 1128) (i.e., because tB8 is equal to the total time during the most recent previous time period tM that the yaw rate flag status YRF4 was equal to "1", the values of tB8 and tM may change over time).

Returning to block 1128, if it is determined in block 1128 that tB8/tM is not >tLIM and that a stability alert is not needed, control may pass to block 1136, where the stability evaluation module 213 may be configured to determine if a stability alert is currently activated. The stability evaluation module 213 may be configured to (in block 1140, if a stability alert is currently activated but is not needed) deactivate the stability alert. The stability evaluation module 213 may also be configured to (in block 1138, simultaneously with execution of block 1136) activate the lane tracing assist system of the vehicle. Control may then return to block 1126, where the stability evaluation module 213 may then update the value of tB3, and then update the quotient tB3/tM (block 1128) as previously described.

Thus, as just described, once block 1126 begins to execute (i.e., after tL>(M), the steps in blocks 1126, 1128 and 1130-1134 may repeat every time period xE, and the proportion of time during the most recent time period tM that the yaw rate flag YRF4 was "1" will be determined, to update the alert status on an "as needed" basis.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A stability monitoring system for detecting an instability condition in a moving vehicle-trailer system, the stability monitoring system comprising:

a processor; and a memory communicably coupled to the processor and storing a stability evaluation module including computer-readable instructions that when executed by the processor cause the processor to:

determine a total amount of time within a predetermined time period that a measured value of at least one stability evaluation parameter satisfied an associated predetermined condition; and when the total amount of time that the measured value satisfied the predetermined condition exceeds a significant proportion of the time period, control operation of the vehicle to deactivate or prevent activation of a lane tracing assist system of the vehicle.

2. The stability monitoring system of claim 1, wherein the at least one stability evaluation parameter comprises a yaw rate of the vehicle, and wherein the associated predetermined condition comprises a condition wherein:

$$(\omega_M - \omega_E)/\omega_E > T1Y)$$

where $\omega_M$=a measured yaw rate, $\omega_E$=an expected yaw rate, T1Y=an associated predetermined yaw rate threshold, and wherein the expected yaw rate is determined by the relationship:

$$\omega_E = v/R_p$$

where v=a velocity of the vehicle and $R_P$=a perceived curve radius of the vehicle.

3. The stability monitoring system of claim 1, wherein the at least one stability evaluation parameter comprises a lateral acceleration of the vehicle, and wherein the associated predetermined condition comprises a condition wherein:

$$(a_M - a_E)/a_E > T2A$$

where $a_M$=a measured lateral acceleration, $a_E$=an expected lateral acceleration, T2A=an associated predetermined lateral acceleration threshold, and wherein the expected lateral acceleration is determined by the relationship:

$$a_E = v^2/R_p$$

where v=a velocity of the vehicle and $R_P$=a perceived curve radius of the vehicle.

4. The stability monitoring system of claim 1, wherein the at least one stability evaluation parameter comprises a lateral acceleration of the vehicle, and wherein the associated predetermined condition comprises a condition wherein a measured lateral acceleration exceeds an associated predetermined lateral acceleration threshold.

5. The stability monitoring system of claim 1, wherein the at least one stability evaluation parameter comprises a yaw rate of the vehicle, and wherein the associated predetermined condition comprises a condition wherein a measured yaw rate exceeds an associated predetermined yaw rate threshold.

6. The stability monitoring system of claim 1, wherein the at least one stability evaluation parameter comprises a yaw rate of the vehicle, and wherein the associated predetermined condition comprises a condition wherein:

$$\left(\int_0^{tM}(\omega_M - \omega_E)d\omega\right) > T5Y$$

where $\omega_M$=a measured yaw rate, and $\omega_E$=an expected yaw rate, tM=a most recent previous predetermined time period, T5Y=an associated predetermined threshold value, and wherein the expected yaw rate is determined by the relationship:

$$\omega_E = \frac{v}{R_p}$$

where v=a velocity of the vehicle and $R_P$=a perceived curve radius of the vehicle.

7. The stability monitoring system of claim 1, wherein the at least one stability evaluation parameter comprises a lateral acceleration of the vehicle, and wherein the associated predetermined condition comprises a condition wherein:

$$\left(\int_0^{tM}(a_M - a_E)d\omega\right) > T8A$$

where $a_M$=a measured lateral acceleration, $a_E$=an expected lateral acceleration, tM=a most recent previous predetermined time period, and T8A=an associated predetermined threshold value, and wherein the expected lateral acceleration is determined by the relationship:

$$a_E = v^2/R_p$$

where v=a velocity of the vehicle and $R_P$=a perceived curve radius of the vehicle.

8. A stability monitoring system for detecting an instability condition in a moving vehicle-trailer system, the stability monitoring system comprising:

a processor; and a memory communicably coupled to the processor and storing a stability evaluation module including computer-readable instructions that when executed by the processor cause the processor to:

if a measured value of at least one stability evaluation parameter satisfies an associated predetermined evaluation parameter condition, determine an accumulation value of the at least one stability evaluation parameter;

if the accumulation value satisfies a first predetermined accumulation condition, set the accumulation value equal to a first limit value; and if the accumulation value satisfies a second predetermined accumulation condition after being set to the first limit value, control operation of the vehicle to deactivate or prevent activation of a lane tracing assist system of the vehicle.

9. The stability monitoring system of claim 8, wherein the at least one stability evaluation parameter comprises a yaw rate of the vehicle, wherein the accumulation value of the at least one stability evaluation parameter comprises a delta yaw accumulation based on a difference between a measured yaw rate and an expected yaw rate, and wherein the second predetermined accumulation condition comprises a condition wherein the delta yaw accumulation exceeds an associated predetermined threshold value, and wherein the expected yaw rate is determined by the relationship:

$$\omega_E = v/R_p$$

where v=a velocity of the vehicle and $R_P$=a perceived curve radius of the vehicle.

10. The stability monitoring system of claim 8, wherein the at least one stability evaluation parameter comprises a lateral acceleration of the vehicle, wherein the accumulation value of the at least one stability evaluation parameter comprises a delta lateral acceleration accumulation based on a difference between a measured lateral acceleration and an expected lateral acceleration, and wherein the second predetermined accumulation condition comprises a condition wherein the delta lateral acceleration accumulation exceeds an associated predetermined threshold value, and wherein the expected lateral acceleration is determined by the relationship:

$$a\Sigma = v^2/R_p$$

where v=a velocity of the vehicle and $R_P$=a perceived curve radius of the vehicle.

11. The stability monitoring system of claim 8, wherein the stability evaluation module includes computer-readable instructions that when executed by the processor cause the processor to:

if the accumulation value does not satisfy the first predetermined accumulation condition, determine if the accumulation value satisfies a third predetermined accumulation condition;

if the accumulation value satisfies the third predetermined accumulation condition, set the accumulation value equal to a second limit value different from the first limit value; and if the accumulation value satisfies the second predetermined accumulation condition after being set to the second limit value, deactivate a lane tracing assist system of the vehicle.

12. A computer-implemented method for detecting an instability condition in a moving vehicle-trailer system, the method comprising steps of:

determining a total amount of time over a predetermined time period that a measured value of at least one stability evaluation parameter satisfied an associated predetermined condition;

determining if the total amount of time exceeds a significant proportion of the predetermined time period, within a range of 10%-30% (inclusive) of the predetermined time period;

if the total amount of time exceeds the significant proportion of the predetermined time period, controlling operation of the vehicle to deactivate a lane tracing assist system of the vehicle; and if the total amount of time does not exceed the significant proportion of the predetermined time period, controlling operation of the vehicle to activate the lane tracing assist system.

13. The method of claim 12, wherein the at least one stability evaluation parameter comprises a yaw rate of the vehicle, and wherein the associated predetermined condition comprises a condition wherein:

$$(\omega_M - \omega_E)/\omega_E > T1Y)$$

where $\omega_M$=a measured yaw rate, $\omega_E$=an expected yaw rate, T1Y=an associated predetermined yaw rate threshold, and wherein the expected yaw rate is determined by the relationship:

$$\omega_E = v/R_p$$

where v=a velocity of the vehicle and $R_p$=a perceived curve radius of the vehicle.

14. The method of claim 12, wherein the at least one stability evaluation parameter comprises a lateral acceleration of the vehicle, and wherein the associated predetermined condition comprises a condition wherein:

$$(a_M - a_E)/a_E > T2A$$

where $a_M$=a measured lateral acceleration, $a_E$=an expected lateral acceleration, T2A=an associated predetermined lateral acceleration threshold, and wherein the expected lateral acceleration is determined by the relationship:

$$a_E = v^2/R_p$$

where v=a velocity of the vehicle and $R_p$=a perceived curve radius of the vehicle.

15. The method of claim 12, wherein the at least one stability evaluation parameter comprises a lateral acceleration of the vehicle, and wherein the associated predetermined condition comprises a condition wherein a measured lateral acceleration exceeds an associated predetermined lateral acceleration threshold.

16. The method of claim 12, wherein the at least one stability evaluation parameter comprises a yaw rate of the vehicle, and wherein the associated predetermined condition comprises a condition wherein a measured yaw rate exceeds an associated predetermined yaw rate threshold.

17. The method of claim 12, wherein the at least one stability evaluation parameter comprises a yaw rate of the vehicle, and wherein the associated predetermined condition comprises a condition wherein:

$$\left( \int_0^{tM} (\omega_M - \omega_E) d\omega \right) > T5Y$$

where $\omega_M$=a measured yaw rate, $\omega_E$=an expected yaw rate, tM=a most recent previous predetermined time period, T5Y=an associated, predetermined threshold value, and wherein the expected yaw rate is determined by the relationship:

$$\omega_E = \frac{v}{R_p}$$

where v=a velocity of the vehicle and $R_p$=a perceived curve radius of the vehicle.

18. The method of claim 12, wherein the at least one stability evaluation parameter comprises a lateral acceleration of the vehicle, and wherein the associated predetermined condition comprises a condition wherein:

$$\left( \int_0^{tM} (a_M - a_E) d\omega \right) > T8A$$

where $a_M$=a measured lateral acceleration, $a_E$=an expected lateral acceleration, tM=a most recent previous predetermined time period, and T8A=an associated predetermined threshold value, and wherein the expected lateral acceleration is determined by the relationship:

$$a_E = v^2/R_v$$

where v=a velocity of the vehicle and $R_p$=a perceived curve radius of the vehicle.

19. The method of claim 12, further comprising a step of controlling operation of the vehicle to deactivate or prevent activation of a lane tracing assist system of the vehicle if the total amount of time that the measured value of the stability evaluation parameter satisfied the predetermined condition exceeds the significant proportion of the predetermined time period.

* * * * *